(12) United States Patent  
Chiang et al.

(10) Patent No.: US 7,818,389 B1  
(45) Date of Patent: Oct. 19, 2010

(54) PACKET BUFFER APPARATUS AND METHOD

(75) Inventors: John M. Chiang, San Jose, CA (US); Cesar A. Johnston, Sunnyvale, CA (US)

(73) Assignee: Marvell International Ltd., Hamilton (BM)

( * ) Notice: Subject to any disclaimer, the term of this patent is extended or adjusted under 35 U.S.C. 154(b) by 342 days.

(21) Appl. No.: 11/948,753

(22) Filed: Nov. 30, 2007

Related U.S. Application Data

(60) Provisional application No. 60/868,216, filed on Dec. 1, 2006.

(51) Int. Cl.  
*G06F 15/167* (2006.01)

(52) U.S. Cl. ...................................... 709/212; 711/118

(58) Field of Classification Search .......... 709/212–216  
See application file for complete search history.

(56) References Cited

U.S. PATENT DOCUMENTS

| | | | |
|---|---|---|---|
| 6,941,391 B2 * | 9/2005 | Kasper | 710/22 |
| 7,571,216 B1 * | 8/2009 | McRae et al. | 709/213 |

OTHER PUBLICATIONS

ITU-T Telecommunication Standardization Sector of ITU—G.984. 4—Series G: Transmission Systems and Media, Digital Systems and Networks, Digital sections and digital line system—Optical line systems for local and access networks—Gigabit-capable Passive Optical Networks (G-PON): ONT management and control interface specification (2004).

ITU-T Telecommunication Standardization Sector of ITU—G.984.4 Amendment 1, Series G: Transmission Systems and Media, Digital Systems and Networks, Digital sections and digital line system—Optical line systems for local and access networks—Gigabit-capable Passive Optical Networks (G-PON): ONT management and control interface specification (2005).

(Continued)

*Primary Examiner*—Salad Abdullahi  
(74) *Attorney, Agent, or Firm*—Marshall, Gerstein & Borun LLP

(57) ABSTRACT

In managing and buffering packet data for transmission out of a host, descriptor ring data is pushed in from a host memory into a descriptor ring cache and cached therein. The descriptor ring data is processed to read a data packet descriptor, and a direct memory access is initiated to the host to read the data packet corresponding to the read data packet descriptor to a data transmission buffer. The data packet is written by the direct memory access into the data transmission buffer and cached therein. A return pointer is written to the host memory by the direct memory access indicating that the data packet descriptor has been read and the corresponding data packet has been transmitted. In managing and buffering packet data for transmission to a host, descriptor ring data is pushed in from a host memory into a descriptor ring cache and cached therein. Data packets for transmission to the host memory are received and cached in a data reception buffer. Data is read from the data reception buffer according to a data packet descriptor retrieved from the descriptor ring cache, and the data packet is written to a data reception queue within the host memory by a direct memory access. A return pointer is written to the host memory by the direct memory access indicating that the data packet has been written.

25 Claims, 13 Drawing Sheets

OTHER PUBLICATIONS

ITU-T Telecommunication Standardization Sector of ITU—G.984.4 Amendment 2—Series G: Transmission Systems and Media, Digital Systems and Networks, Digital sections and digital line system—Optical line systems for local and access networks—Gigabit-capable Passive Optical Networks (G-PON): ONT management and control interface specification (2006).

ITU-T Telecommunication Standardization Sector of ITU G.984.3—Series G: Transmission Systems and Media, Digital Systems and Networks, Digital sections and digital line system—Optical line systems for local and access networks—Gigabit-capable Passive Optical Networks (G-PON): Transmission convergence layer specification (2004).

ITU-T Telecommunication Standardization Sector of ITU G.984.4, Series G: Transmission Systems and Media, Digital Systems and Networks, Digital sections and digital line system—Optical line systems for local and access networks, Gigabit-capable Passive Optical Networks (G-PON): ONT management and control interface specification (2004).

ITU-T Telecommunication Standardization Sector of ITU G.984.4 Amendment 1, Series G: Transmission Systems and Media, Digital Systems and Networks—Digital sections and digital line system—Optical line systems for local and access networks, Gigabit-capable Passive Optical Networks (G-PON): ONT management and control interface specification (2005).

ITU-T Telecommunication Standardization Sector of ITU G.984.4 Amendment 2, Series G: Transmission Systems and Media, Digital Systems and Networks—Digital sections and digital line system—Optical line systems for local and access networks, Gigabit-capable Passive Optical Networks (G-PON): ONT management and control interface specification (2006).

* cited by examiner

PACKET BUFFER APPARATUS AND METHOD

CROSS-REFERENCES TO RELATED APPLICATIONS

The present application claims the benefit of U.S. Provisional Application No. 60/868,216, entitled "PACKET BUFFER ARCHITECTURE," filed on Dec. 1, 2006, which is hereby incorporated by reference herein in its entirety.

FIELD OF TECHNOLOGY

The present disclosure relates generally to packet buffering and handling, and more particularly, to packet buffering and handling within a gigabit passive optical network.

DESCRIPTION OF THE RELATED ART

The traditional descriptor ring architecture has been used widely in the communication world. A traditional descriptor ring architecture set up a descriptor ring in the host memory, which, in combination with related Direct Memory Access (DMA) hardware, controlled the packet buffering. Firmware or software configured the set of descriptor rings. The hardware polled into the host constantly to see if the descriptor was ready for use by the hardware.

Previous data packet buffering and handling methods involved many read operations, for example reading data descriptors from the host memory by polling the hardware. As a result, the host memory read operations took a long time as compared to the host memory write operations. Read operations therefore took a lot of overhead, which is undesirable when buffering time-sensitive data packets (low latency), such as audio, video, etc. Even when using a fast bus for time-sensitive data packets, the bus was often unable to get a read done in one transaction. Instead, the bus tried the read operation in several tries, each time having to reschedule each read which was controlled by a bus arbiter. This caused even a single read to be time consuming. Read operations also caused the host to have to stop and wait for a data return, thereby creating slow and inefficient processing, and thus lost bandwidth due to unnecessary overhead traffic. Polling the ownership bits further caused lost bandwidth and unnecessary traffic. For example, every time a hardware DMA engine finished transmitting or receiving, the DMA engine went into the host memory descriptor ring and changed the ownership bits to the host. This constant changing of ownership bits were therefore an inefficient and wasteful use of bus bandwidth. On the other hand, direct writes to memory are much faster. In a multi-processor and/or multi-thread system, service interrupts to the host caused all processors or threads to be activated to determine which interrupts had been enabled, which tended to increase processor overhead and reduce the efficient use of the processors or threads.

However, there are few implementations that try to solve issues such as slow response time, high processor overhead, host/hardware polling, long latency due to double or even triple layers of lookup and translation, and the utilization of a large cache to store the descriptor table and caching. At the same time, these few implementations include control logic which may be quite complicated and cause the die size of the chip to be large and increase verification time.

SUMMARY OF THE DISCLOSURE

In one embodiment, a method of managing and buffering packet data for transmission out of a host comprises caching descriptor ring data pushed in from a host memory into a descriptor ring cache, where the descriptor ring data comprises one or more data packet descriptors each corresponding to a data packet to be transmitted and where the descriptor ring data is written by the host into the descriptor ring cache, processing the descriptor ring data cached in the descriptor ring cache to read a data packet descriptor from the descriptor ring data, initiating a direct memory access transfer from the host to read the data packet corresponding to the read data packet descriptor to a data transmission buffer, caching the requested data packet from the host memory into the data transmission buffer, where the requested data packet is written by the direct memory access into the data transmission buffer in response to the direct memory access transfer from the host, transmitting the cached data packet out of the data transmission buffer, and writing a return pointer to the host memory indicating that the data packet descriptor has been read and the corresponding data packet has been transmitted.

In another embodiment, a method managing and buffering packet data for transmission to a host comprises caching descriptor ring data pushed in from a host memory into a descriptor ring cache, where the descriptor ring data comprises one or more data packet descriptors each corresponding to a data packet to be received and where the descriptor ring data is written by the host into the descriptor ring cache, caching data packets for transmission to the host memory into a data reception buffer, reading data from the data reception buffer according to a data packet descriptor retrieved from the descriptor ring cache, initiating a direct memory access transfer to write the data packet to a data reception queue within the host memory, and writing a return pointer to the host memory indicating that the data packet has been written to the host memory.

DETAILED DESCRIPTION

Figure 1:
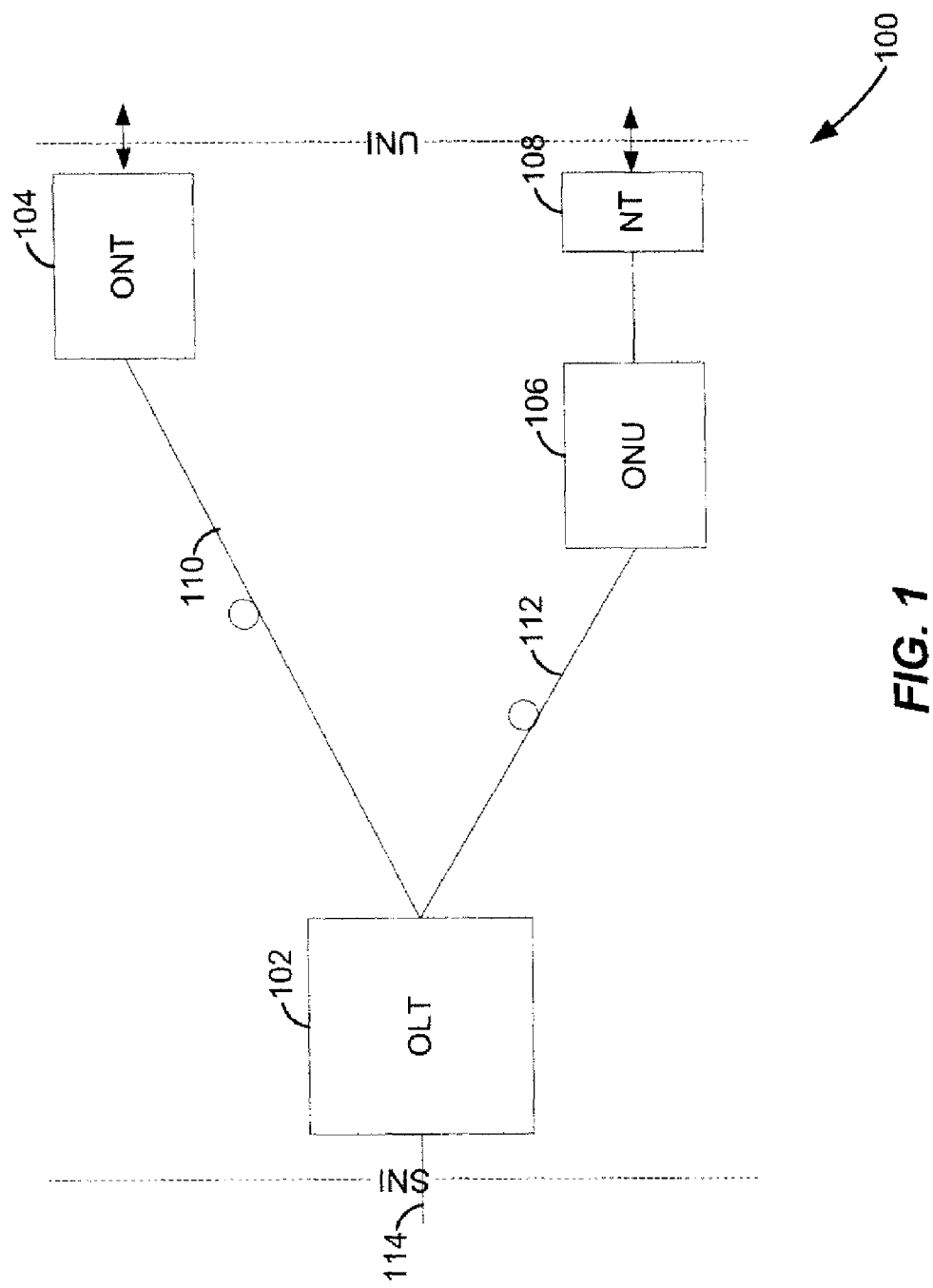
FIG. 1 a block diagram of a passive optical network.

FIG. 1 is a block diagram of an example passive optical network 100 that includes an optical line termination (OLT) 102 coupled to an optical network terminal (ONT) 104 and an optical network unit (ONU) 106. Generally, the passive optical network 100 is a point-to-multipoint network, where the OLT 102 is provided as a service node interface, for example at a server or service provider, such as an interne service provider, television service provider, telephony service provider or other provider of network services. The ONT 104 and/or ONU 106 are each provided as an user node interface, for example at or near an end user. While the OLT 102 may be provided at the service provider site, the OLT 102 may also be provided as one of several OLTs within a distributed network, where each OLT is associated with corresponding ONUs 106 and/or ONTs 104.

As shown in FIG. 1, the OLT 102 is communicatively coupled to the ONT 104 via an optical fiber 110, and communicatively coupled to the ONU 106 via an optical fiber 112. The optical fibers 110, 112 may be part of an optical distribution network (ODN). Although only one ONT 104 and one ONU 106 are shown to be communicatively coupled to the OLT 102, it should be understood that in a point-to-multipoint optical network, optical fibers may be each be run, one-to-one from the OLT 102 to an ONT 104 and/or an ONU 106, where there may be multiple ONTs 104 and/or ONUs 106 in the passive optical network 100 each of which may, in turn, service multiple end users. As such, a single OLT 102 may service multiple end users on the same or a few optical fibers. As is understood, both the ONT 104 and the ONU 106 operate to terminate the passive optical network 100. An ONT 104 may refer to an integrated unit for an end user that presents the services of the service provider to the end user (e.g., video, data, telephony, etc.). An ONU 106 may be an optoelectronic interface to network termination (NT) equipment 108, where the ONU 106 terminates the passive optical network and the NT equipment 108 provides the services to the end user. The ONU 106 handles data packet conversion between the passive optical network 100 and the NT equipment 108, and the NT equipment 108 may provide an interface to the end user. While this disclosure references both ONTs 104 and ONUs 106, it should be understood that in the context of this disclosure, ONTs 104 and ONUs 106 may be treated similarly and these terms may be used interchangeably with optical network terminal generally referring to both ONTs 104 and ONUs 106.

Generally, the OLT 102 provides downstream broadcasts to each of the ONTs 104 and each of the ONUs 106 on different dedicated one-to-one fibers, where each ONT 104 and/or ONU 106 individually reads only the content of the transmissions intended for the particular ONT 104 and/or ONU 106. The ONTs 104 and the ONUs 106 provide upstream transmissions to the OLT 102 via their virtual fibers via time division multiplexed (TDM) bursting. Communications between the OLT 102 and the ONT 104 or ONU 106 generally utilize wavelength division multiplexing with the downstream broadcasts utilizing one wavelength and upstream transmissions utilizing another wavelength. Although the passive optical network 100 is described as having one-to-one fibers between the OLT 102 and the ONTs/ONUs 104, 106, it should be understood that multiple fibers may be utilized in the one-to-one correspondence between the OLT 102 and each corresponding ONT/ONU 104, 106. In one example, each connection between the OLT 102 and the ONTs/ONUs 104, 106 may utilize two fibers, with one for upstream transmissions and one for downstream transmission, rather than wavelength division multiplexing signals that share the same fiber.

The OLT 102 provides a variety of functions within the passive optical network 100. At one level, the OLT 102 provides the interface 114 between the passive optical network 100 and a backbone network of the service provider network, which may include supporting time division multiplexed (TDM) protocols at different rates of speed, internet protocol (IP) traffic, asynchronous transfer mode (ATM) protocols, etc. The OLT 102 further facilitates both upstream and downstream communication between the service provider and the ONTs 104 and ONUs 106, and between ONTs 104 and ONUs 106. For example, the OLT 102 allocates upstream bandwidth to the ONTs 104 and ONUs 106 by granting intervals of time (e.g., time slot assignments) to each of the ONTs 104 and ONUs 106 to transmit upstream communications without collisions on the fiber. Upstream bandwidth allocation may be fixed for ONTs 104 or ONUs 106 requiring continuous (e.g., guaranteed) bandwidth availability. For ONTs 104 or ONUs 106 that do not require continuous bandwidth availability (e.g., burst transmissions), the OLT 102 may utilize dynamic bandwidth allocation (DBA) based on either polling bandwidth information from the ONTs 104 and ONUs 106 or based on the occurrence of idle gigabit passive optical network (GPON) encapsulation method (GEM) frames from the ONTs 104 or ONUs 106. In addition, the ONTs 104 and ONUs are typically provided at different distances from the OLT 102, and the OLT 102 utilizes a ranging protocol to equalize the optical path length and equalize the transmission delay between the OLT 102 and the various ONTs 104 and ONUs 106. For example, the OLT 102 may measure the transmission delay for each ONT 104 and ONU 106, and transmits a physical layer operations and maintenance (PLOAM) message to set the transmission delay in the ONT 104 or ONU 106. The OLT 102 further provides centralized media access control (MAC) for the passive optical network 100 for purposes of upstream bandwidth allocation.

Upstream and downstream transmissions between the OLT 102 and the ONTs 104 or ONUs 106 may be performed in a transmission convergence frame format, whereby the transmission data, regardless of the services being provided, is encapsulated in the same type of data packet for transmission over the passive optical network 100. In particular, the transmissions between the OLT 102 and the ONTs 104 or ONUs 106 may take advantage of the gigabit passive optical network (GPON) standard developed by the International Telecommunications Union (ITU). The GPON standard is also known as ITU-T G.984. As is known, the GPON standard generally provides greater security as compared to previous standards, greater bandwidth, larger variable-width data packets, higher data rates and supports various Layer 2 protocols including ATM and GPON encapsulation method (GEM).

Although the disclosure generally refers to a gigabit passive optical network (GPON), it should be understood that all or part of this disclosure may be equally applicable to, or supportive of, previous-generation passive optical network standards, such as asynchronous transfer mode (ATM) passive optical network (APON) and broadband passive optical network (BPON), current passive optical network standards, such as Ethernet passive optical network (EPON), and future passive optical network standards, such as wavelength division multiplex passive optical network (WDM-PON). The disclosure may also be equally applicable to variations on the GPON standard.

Figure 2:
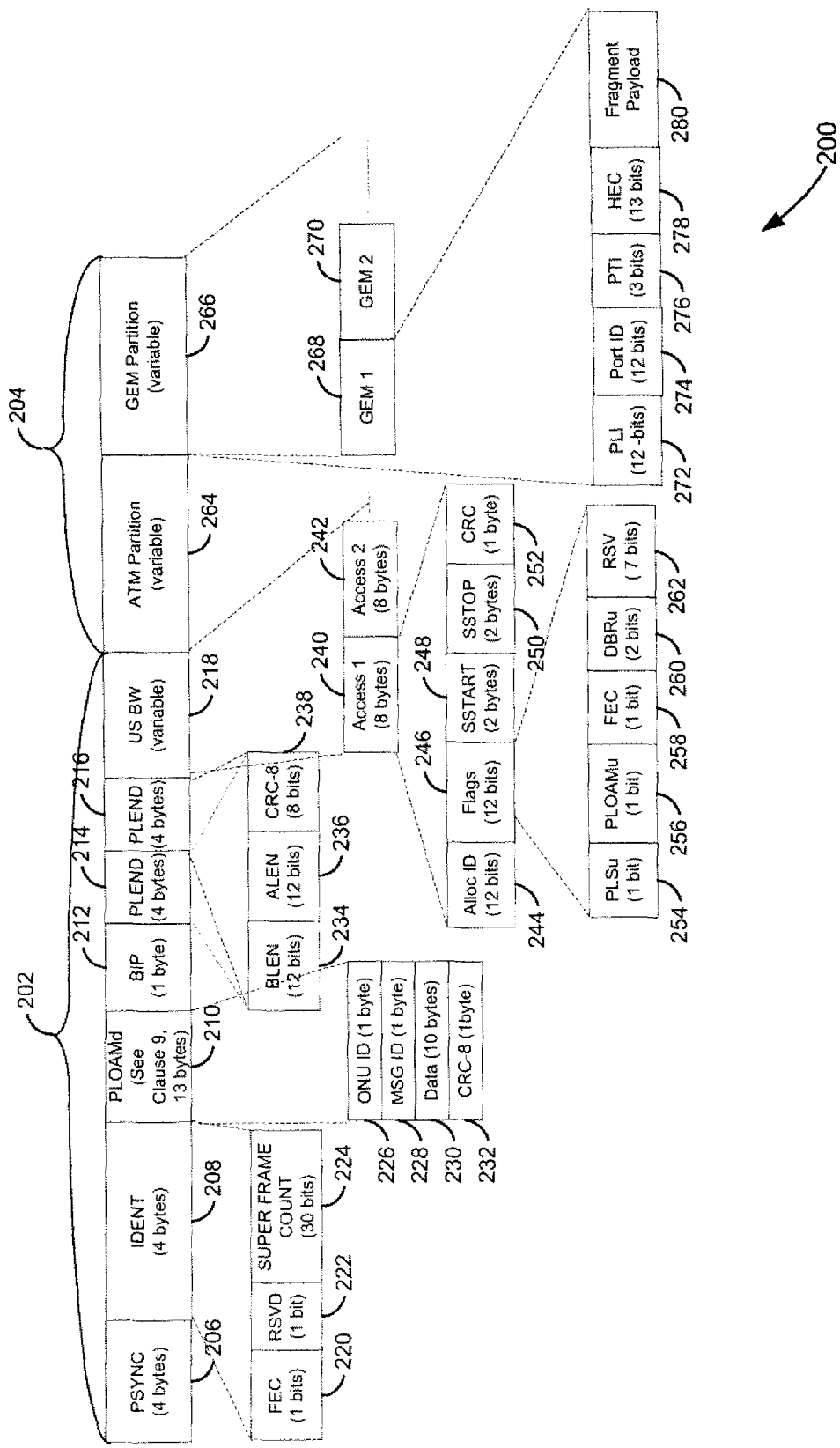
FIG. 2 is a schematic diagram of a downstream gigabit passive optical network transmission convergence frame format.

FIG. 2 is an example of a downstream transmission convergence layer (TC-Layer) frame format 200 using the GPON standard and which may be utilized for downstream transmissions from the OLT 102 to the ONTs 104 and ONUs 106. The downstream frame format 200 generally includes an overhead field 202 and a payload field 204, where the overhead field 202 includes several sub-fields to be assembled by the OLT 102 and the payload field 204 includes the information being sent to the ONT 104 or ONU 106 (e.g., service data). As indicated above, the data for the payload field 204 may be provided in one or more transport formats, such as ATM or GEM, and as a variable length data packet. As also indicated above, while the following disclosure involves an example of the downstream transmission convergence layer (TC-Layer) frame format 200, as well as the subsequent upstream transmission convergence layer (TC-Layer) frame format discussed further below, it should be understood that variations of the downstream and upstream formats may occur and the disclosure is not limited to the particulars examples given herein. Generally, the downstream frame provides a common time reference for the passive optical network 100, and provides common control signaling for the upstream.

The overhead field 202 for the downstream transmission frame is generally broadcast by the OLT 102 to all ONTs/ONUs 104, 106. Each ONT/ONU 104, 106 is then able to act upon relevant information contained in the overhead field 202. The overhead field 202 for the downstream transmission frame may be referred to as the physical control block downstream (PCBd), and may include a physical synchronization (PSYNC) field 206, an identification (Ident) field 208, a physical layer operations and maintenance downstream (PLOAMd) field 210, a bit interleaved parity (BIP) field 212, two payload length downstream (PLEND) fields 214, 216 and an upstream bandwidth map (US BWmap) field 218. The PSYNC field 206 is a fixed pattern that generally begins the overhead field 202, such that an ONT 104 or ONU 106 may use the PSYNC field 206 to identify the beginning of the frame 200 and establish synchronization with the downstream transmission. When the ONT 104 or ONU 106 finds the PSYNC field 206 within a frame of a downstream transmission from the OLT 102, the ONT/ONU 104, 106 may utilize a synchronization state machine, or other synchronization method, and search for other PSYNC fields 206 within subsequent frames to establish and monitor the synchronization state with the transmission. In one example, a counter may be set upon identifying a unique value in the PSYNC field 206, with the counter being incremented for each valid PSYNC field 206 read by the ONT/ONU 104, 106. Once the counter reaches a predetermined threshold of consecutive PSYNC fields, the ONT/ONU 104, 106 is able to enter into a synchronization state whereby the ONT/ONU 104, 106 is in synchronization with the downstream transmission rate. The ONT/ONU 104, 106 may thereby determine it has discovered the downstream frame structure and begin to process the overhead information. The ONT/ONU 104, 106 may also maintain a count for invalid or incorrect PSYNC fields 206, and if the incorrect count reaches a predetermined threshold of consecutive PSYNC fields, the ONT/ONU 104, 106 may determine that it has lost the downstream frame structure and repeat the search for a valid or correct PSYNC field 206. However, it should be understood that different state machines or different manners of establishing and monitoring synchronization with the transmission may be utilized.

The Ident field 208 may be used to indicate large frame structures (superframes) within the downstream transmission frame, and which may be used to control data encryption. Generally, the Ident field 208 includes an FEC field 220, a reserved field 222 and a superframe counter 224. The EEC field 220 indicates whether forward error correction (FEC) is being enabled on the present downstream frame and may be used for FEC control. As is known, forward error correction is a method of error control for transmissions, where the OLT 102 may add redundant data to the downstream transmission frame, and the ONT/ONU 104, 106 may detect and correct errors using the redundant data, thereby avoiding retransmission of the downstream transmission frame from the OLT 102. The reserved field 222 is reserved for other purposes, and the superframe counter 224 provides error checking for potential dropped frames. The ONT/ONU 104, 106 loads the superframe counter value and compares its local expected value with the superframe counter value, whereby a match indicates correct synchronization and a mismatch indicates a transmission error or desynchronization.

The PLOAMd field 210 contains a downstream PLOAM message from the OLT 102 for the ONT/ONU 104, 106. A PLOAM message is generally a control message that may relate to a variety of information or instructions for the ONT/ONU 104, 106, including, but not limited to, alerts, activation-related messages, instructions, etc. For example, an Upstream_Overhead PLOAM message may instruct the ONT/ONU 104, 106 to use a particular preassigned equalization delay during ranging and number of preamble bytes for upstream transmissions, define the transmission power of the ONT/ONU 104, 106. A Serial_number_mask PLOAM message may provide a serial number and a mask for part of the serial number. An Assign_ONU-ID PLOAM message may assign an identification with the serial number of the ONT/ONU 104, 106. A Ranging_Time PLOAM message may provide a value for an equalization delay register of the ONT/ONU 104, 106. A Deactivate_ONU-ID PLOAM message may provide a deactivation/reset instruction to stop sending upstream transmissions. A Disable_serial_number PLOAM message may provide a disable/enable instruction to an ONT/ONU 104, 106. A Configure_VP/VC PLOAM message may activate or deactivate a virtual channel or a virtual path at the ATM layer. An Encrypted_Port-ID/VPI PLOAM message may indicate encrypted and unencrypted channels to the ONT/ONU 104, 106. A Request_password PLOAM message may request a password from the ONT/ONU 104, 106 for verification. An Assign_Alloc-ID PLOAM message may assign an allocation identification to an ONT/ONU 104, 106. A POPUP PLOAM message may instruct the ONT/ONU 104, 106 to move to a ranging state or an operation state. A Request_Key PLOAM message may trigger the ONT/ONU 104, 106 to generate a new encryption key. A Configure Port-ID PLOAM message may link a management and control interface of the ONT/ONU 104, 106 (OMCI) with a Port-ID which may be appended to an overhead of GEM encapsulated payload to be used as an addressing mechanism to route the OMCI over the GEM channel. A PEE-Physical Equipment Error PLOAM message to indicate that the OLT is unable to sent both ATM cells, GEM frames and ONT/ONU 104, 106 Management and Control Channel (OMCC). A Change-Power-Level PLOAM message may trigger the ONT/ONU 104, 106 to increase or decrease it transmission power level. A PST (PON Section Trace) PLOAM message may be provided to check the connectivity between the ONT/ONU 104, 106 and the OLT, and to perform Automatic Protective Switching (APS). A BER interval PLOAM message may be provided to define the accumulation interval per ONT/ONU 104, 106 expressed as a number of downstream frames for the ONT/ONU 104, 106 counting the number of downstream bit errors. A Key Switching Time PLOAM message may indicate when the ONT/ONU 104, 106 when to begin using a new encryption key.

As seen in FIG. 2, the PLOAMd field 210 is formatted to include an ONU ID 226, a Message-ID 228, the message Data 230 and a cyclic redundancy check (CRC) 232. The ONU ID 226 identifies the ONT/ONU 104, 106 to receive the PLOAM message. The Message-ID 228 identifies the type of PLOAM message, example of which are provided above. The message Data 230 are used for the payload of the PLOAM message. The CRC 232 is a frame check sequence, such that the PLOAM message may be discarded upon receipt if the CRC is incorrect.

The BIP field 212 contains the bit interleaved parity of the bytes that have been transmitted since the previous BIP. The ONT/ONU 104, 106 independently determined the BIP and compares the result to the BIP field 212 to measure the number of errors in the transmission.

The Plend field 214, 216 specifies the length of the bandwidth map (BWmap) (also referred to as the bandwidth allocation) and any ATM partition in the payload 204. The BWmap length is provided in a Blen field 234, and the ATM partition length related information is provided in a Alen field 236. As seen in FIG. 2, the Plend field 214, 216 is a redundant field for error robustness. The Plend field 214, 216 may be protected by CRC (e.g., CRC-8) for error detection and correction as provide in a CRC field 238. In particular, the length of the bandwidth map provides the limit of the number of allocation IDs that may be granted in any particular duration in any 125 microsecond duration up to 4095. The actual length of the BWmap field 218 is then 8 times the Blen value. The Alen field 236 may allow up to a particular number of ATM cells in a frame (e.g., a 12-bit Alen field allows 4095 ATM cells), up to a particular data rate (e.g., 10 Gbits/s). The length of the ATM partition is then 53 times Alen. The ONT/ONU 104, 106 implements the error detection and correcting functions of the CRC field 238, decodes both copies of the Plend field 214, 216, and uses the copy based upon the result of the CRC detection process (e.g., the copy that is error free or that has a correctible error).

The US BWmap field 218 provides an upstream bandwidth allocation as processed by the OLT acting as the main or central controller for the ONTs 104 and ONUs 106. The BWmap field is provided as an array of allocation structures 240, 242 (Access1, Access2, etc.), where each entry in the array represents a single bandwidth allocation to a particular transmission container (T-CON). The number of entries in the BW map is provided in the Plend field 214, 216. The access fields are distributed to the ONT/ONU 104, 106 which become slaves to the OLT and are required to follow the provided format.

As shown in FIG. 2, each allocation structure 240, 242 includes an Alloc ID field 244, a Flags field 246, a SSTART field 248, a SSTOP field 250 and a CRC field 252. The Alloc ID field 244 indicated the particular T-CONT that is being granted time on the upstream, and includes an address of the ONT/ONU 104, 106 receiving the T-CONT.

The Flags field 246 contains five separate indications on how the allocation should be used by the ONT/ONU 104, 106, including information to be sent back to the OLT during the bandwidth allocation provided to the ONT/ONU 104, 106. The Flags field 246 includes a PLSu field 254, a PLOAMu field 256, an FEC field 258, a DBRu field 260 and an RSV field 262. The PLSu field 254 is a power leveling sequence used for power control measurements by the ONT/ONU 104, 106 which, if set, directs the ONT/ONU 104, 106 to send its PLSu information during the bandwidth associated allocation. If the PLSu bit is not set, the ONT/ONU 104, 106 does not send its PLSu information for the associated bandwidth allocation. The power control measurements function allows for adjustment of the power levels of the ONT/ONU 104, 106 to reduce the optical dynamic range as seen by the OLT, and is useful in initial power set-up of the ONT/ONU 104, 106 (e.g., during activation), and power mode change of the ONT/ONU 104, 106 transmitter (e.g., during activation or operation). The PLOAMu field 256 directs the ONT/ONU 104, 106 to send its PLOAMu information during the associated bandwidth allocation, if the bit is set. Examples of the PLOAM messages are discussed above. The FEC field 258 causes the ONT/ONU 104, 106 to compute and insert an FEC parity during the associated bandwidth allocation, if the bit is set. The DBRu field 260 causes the ONT/ONU 104, 106 to send an upstream Dynamic Bandwidth Report indicating the number of cells or blocks in the T-CONT buffer of the ONT/ONU 104, 106, whereby the OLT may determine the congestion status of each T-CONT. The RSV field 262 is reserved for future use.

The SSTART field 248 is the start time field indicating the starting time for upstream transmission (i.e., the starting time of the bandwidth allocation). The SSTOP field 250 is the stop time field indication the stop time for the upstream transmission. Each ONT/ONU 104, 106 uses the SSTART and SSTOP fields 248, 250 to determine when to start and stop its upstream transmission. Each ONT/ONU 104, 106 identifies which particular information among the allocation structures is for its own use as filtered through the Allocation ID 244 bits within the access portion of the frame. The CRC field 252 is a cyclic redundancy check (e.g., CRC-8) that protects each allocation structure, where the ONT's/ONU's 104, 106 BWmap field 218 processing implements error detecting and correcting functions of the CRC. If an uncorrectable error occurs as indicated by the CRC function, the allocation structure is discarded.

The transmission convergence payload field 204 may include both an ATM payload field 264 or partition, and a GEM payload field 266 or partition. As such, a variety of user data type may be carried in the GPON transmission convergence payload. The ATM partition 264 may contain a number of ATM cells, the length of which is provided in the Plend/Alen fields 214/236, 216/236. The OLT 102 may allocate as many cell durations as needed in the downstream, including almost all of the downstream frame. Generally, the ATM partition 264 is an integer multiple of 53 bytes long based upon the Plend/Alen fields 214/236, 216/236, and the ATM cells are aligned to the partition. The downstream cell stream is filtered at the ONT/ONU 104, 106 based upon a virtual path identifier (VPI) or virtual channel identifier (VCI). In particular, each ONT/ONU 104, 106 is configured to recognize which VPI belongs to it, and ATM cells that belong to the ONT/ONU 104, 106 are passed on to the ATM client process.

The GEM partition 266 contains a variable number of GEM frame-mode delineated frames 268, 270 (GEM1, GEM2, etc.). The length of the GEM partition 266 is determined based on whatever remains after the overhead 202 and ATM partitions 264 are subtracted from the overall frame length. The GEM protocol provides delineation of the user data frame (either going to or coming from a user) and provides port identification for multiplexing. Delineation and port identification are accomplished by the GEM header discussed below. The delineation process uses the GEM header at the beginning of every downstream GEM partition and every upstream GEM payload. As such, in a downstream transmission the ONT/ONU 104, 106 is assured of finding the first header and may find subsequent headers using the payload length identifier (PLI) as a pointer.

As seen in FIG. 2, each GEM frame 268, 270 includes a header containing a PLI field 272, a Port-ID field 274, a PTI field 276, HEC field 278, and a fragment payload 280. The PLI field 272 indicates the length of the fragment payload 280 following the header, and is used to identify the next header in the GEM stream to provide delineation. The size of the PLI field 272 (e.g., 12-bits) determines the size of the GEM fragments (e.g., up to 4095 bytes), where data frames larger than the GEM fragment payload size are fragmented into smaller sizes to accommodate the GEM fragment payload size. The Port-ID field 274 is a unique traffic identifier on the passive optical network 100 to provide traffic multiplexing. The PTI field 276 indicates the content type of the fragment payload 280 and how the fragment payload 280 should be treated (e.g., user data fragment; congestion has or has not occurred; end or not end of a frame). The PTI field 276 may be similar to that used in the ATM header. The PTI field 276 indicates which fragment contains the end of the user data frame. The downstream frame transmission is filtered at the ONT/ONU 104, 106 based upon the Port-ID field 274 contained in each GEM fragment. Frames belonging to the ONT/ONU 104, 106, each of which are configured to recognize which Port-IDs belong to it, are passed on to the GEM client process.

The HEC field 278 is header error control which provides error detection and correction functions for the GEM header. The GEM header may be provided at the beginning of each downstream GEM payload and the ONT/ONU 104, 106 uses the PLI field 272 to find the first header, and finds subsequent headers using the PLI as a pointer. The ONT/ONU 104, 106 may thereby transition to the "sync" state at the beginning of each partition and payload. If uncorrectable errors occur in the header as determined based on the HEC field 278, delineation of the GEM partition may lose synchronization with the data stream, and the ONT/ONU 104, 106 attempts to reacquire synchronization. The ONT/ONU 104, 106 searches for a GEM header HEC field 278, and when one is found, the ONT/ONU 104, 106 transitions to a pre-synchronized state, where it looks for the HEC field 278 at the location indicated in the previously found header. If the HEC matches, then the transition is made to the synchronized state. If it does not match, then the transition is made to the search for another HEC.

Figure 3:
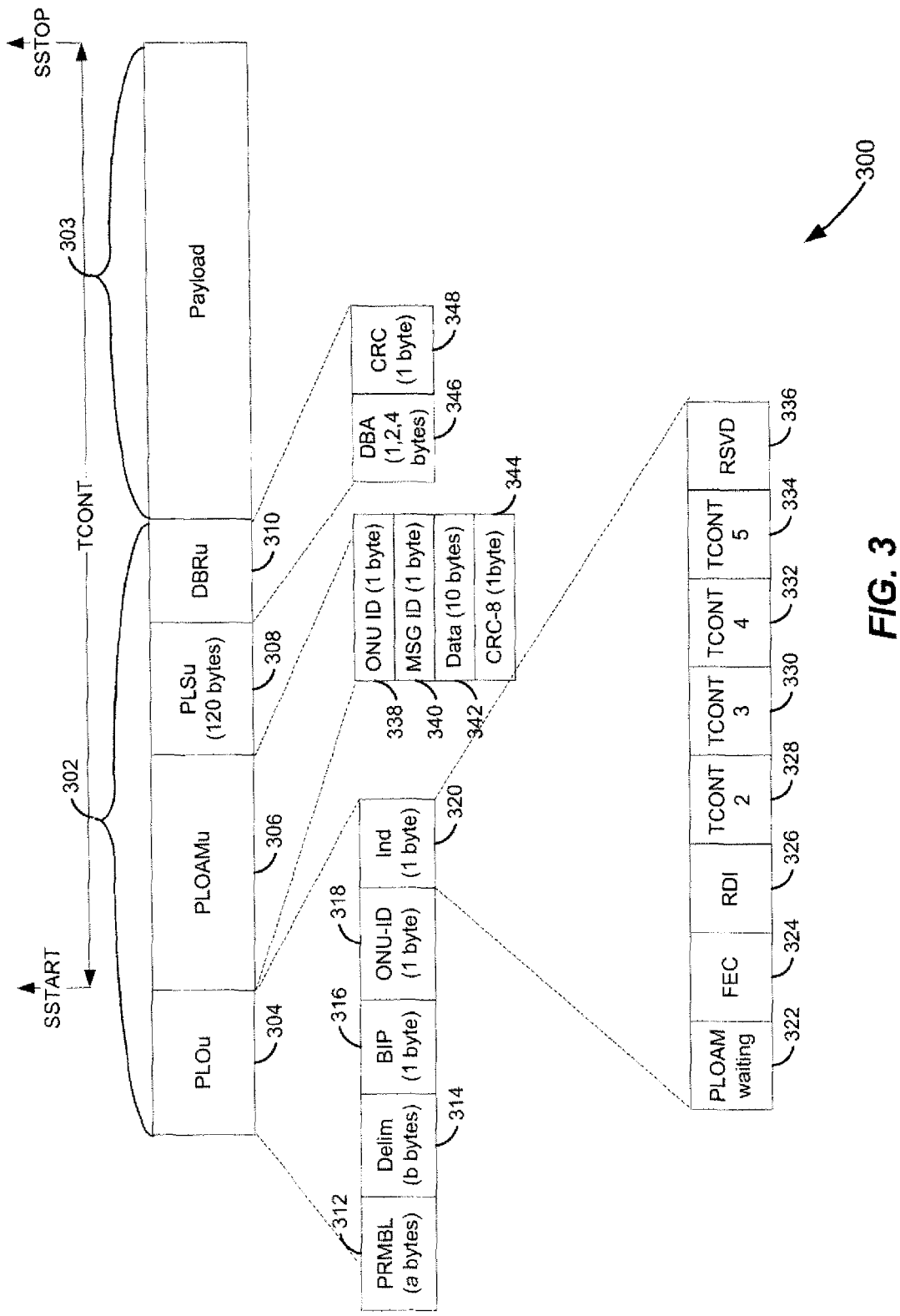
FIG. 3 is a schematic diagram of an upstream gigabit passive optical network transmission convergence frame format.

FIG. 3 is an example of an upstream transmission convergence layer (TC-Layer) frame format 300 using the GPON standard and which may be utilized for upstream transmissions from the ONTs 104 and/or ONUs 106 to the OLT 102. The upstream frame format 300 generally includes an overhead field 302 and a payload field 303. The overhead field 302 includes several sub-fields to be assembled by the ONT/ONU 104, 106 and processed by the OLT 102 and the payload field 303 includes the information being sent to the OLT 102 or to the service provider network. As indicated above, the data for the payload field 303 may be provided in one or more transport formats, such as ATM or GEM, and as a variable length data packet. The frame length of the upstream transmission convergence layer (TC-Layer) frame format 300 may be the same as that of the downstream transmission convergence layer (TC-Layer) frame format 200 for all transmission rates. Each frame may contain a number of transmissions from one or more ONT/ONU 104, 106, where the BWmap defines the arrangement of the transmissions. As seen in FIG. 3, the T-CONT of the upstream message is defined by the start and stop transmission times (SSTART and SSTOP) as determined by the OLT 102 during the downstream transmission, but does not include the PLOu field which is sent immediately prior to the start time pointer SSTART.

The overhead field 302 for the upstream transmission frame may include various types of overheads, including physical layer overhead (PLOu) 304, physical layer operations and management upstream (PLOAMu) 306, power leveling sequence upstream (PLSu) 308 and dynamic bandwidth report upstream (DBRu) 310. As discussed above, the Flag field 246 in the downstream transmission assembled by the OLT 102 indicates whether PLOAMu, PLSu or DBRu information should be sent from the ONT/ONU 104, 106 on each bandwidth allocation. The upstream frame is generally scrambled, and may be scrambled using a frame-synchronous scrambling polynomial.

The PLOu field 304 includes the physical layer overhead, which is provided as a preamble (PRMBL) field 312 and a delimiter (Delim) field 314. Three additional fields of data corresponding to the ONT/ONU 104, 106 as a whole are also provided: a bit interleaved parity (BIP) field 316, a ONT/ONU 104, 106 identification (ONU-ID) field 318 and an indication (Ind) field 320. The above data is generally provided at the beginning on any transmission burst from an ONT/ONU 104, 106. The status of the PLOu information is given by the arrangement of the bandwidth allocations. Every time an ONT/ONU 104, 106 takes over the passive optical network 100 from another ONT/ONU 104, 106, the ONT/ONU 104, 106 sends a new copy of the PLOu data. The GPON transmission convergence layer sources the PLOu 304. The preamble field 312 is used to synchronize the OLT 102 to the incoming message, and the delimiter field 314 is used by the OLT 102 to identify where the first bit of information in the frame begins. The preamble field 312 and the delimiter field 314 are formed as determined by the OLT in the Upstream_Overhead PLOAM message discussed above. As seen in FIG. 3, the preamble and delimiter fields 312, 314 are transmitted before the allocation start time SSTART pointer, as previously dictated by the OLT.

The BIP field 316 contains the bit interleaved parity of the bytes transmitted since the last BIP from the transmitting ONT/ONU 104, 106, excluding those of the preamble and delimiter fields 312, 314. The OLT 102 computes the bit-interleaved parity for each ONT/ONU 104, 106 burst, and compares the result to the BIP of the BIP field 316 to measure the number of errors in the link. The ONU-ID field 318 contain the unique identification of the transmitting ONT/ONU 104, 106. The ONU-ID is generally assigned to the ONT/ONU 104, 106 during the ranging process.

The Ind field 320 provide a real-time ONT/ONU 104, 106 status report to the OLT. As shown in FIG. 3, the format of the Ind field 320 is provided as a PLOAM waiting field 322 indicating if one or more PLOAM messages are waiting, an FEC field 324 indicating if forward error correction is enabled or not, a remote defect indication (RDI) field 326 indicating if a defect occurred or not, traffic waiting indicator fields for type 2 T-CONTs 328, type 3 T-CONTs 330, type 4 T-CONTs 332 and type 5 T-CONTs 334, as well as reserved bits 336. If the PLOAM waiting field 322 indicated an urgent PLOAM message is waiting, the OLT 102 may issue an upstream allocation that allows the ONT/ONU 104, 106 to send the PLOAM message in a timely manner. Further uses of the Ind field 320, and in particular the T-CONT fields 328, 330, 332, 334, are discussed below in relation to the DBRu field 310.

Examples of the PLOAM messages as provided in the PLOAMu field 306 are discussed above, and may be provided by the transmitting ONT/ONU 104, 106 in response to a corresponding request from the OLT 102. In particular, the PLOAMu field 306 may only be sent when indicated by the Flags field 246. The PLOAMu field 306 may have a similar structure as the PLOAMd field 210, including an ONU ID 338 of the transmitting ONT/ONU 104, 106, a Message-ID 340 identifying the type of PLOAM message, the message Data 342 for the payload of the message, and a cyclic redundancy check (CRC) 344 to detect and correct errors in the header fields 338, 340, 342.

The PLSu field 308 is used for power control measurements by the ONT/ONU 104, 106 and adjusts the ONT/ONU 104, 106 power levels to reduce the optical dynamic range seen by the OLT. The content of the PLSu field 308 is generally set by the ONT/ONU 104, 106, and is sent by the ONT/ONU 104, 106 when indicated in the Flags field 246 of a downstream transmission from the OLT 102. For example, the OLT 102 may set the PLSu bit on broadcast allocation to allow the ONT/ONU 104, 106 to set up its transmitter during the activation process. If the ONT/ONU 104, 106 does not use the PLSu field 308, the ONT/ONU 104, 106 may deactivate its transmitter for that time. During operation of the ONT/ONU 104, 106, the ONT/ONU 104, 106 generally transmits following the PLSu field 308 such that the ONT/ONU 104, 106 sends the PLSu field 308 when it is requested by the OLT regardless of any need to perform transmitter adjustment.

The DBRu field 310 includes information that is associated with the T-CONT entity, rather than the ONT/ONU 104, 106. The DBRu field 310 is sent when requested by the OLT in the Flags field 246 of a downstream transmission. The DBRu field 310 includes a dynamic bandwidth allocation (DBA) field 346 and a CRC field 348. The DBA field 346 contains the traffic status of the particular T-CONT, and may be used by the OLT 102 for bandwidth allocation for the ONT/ONU 104, 106. The DBA field 346 may be supported via status reporting and OLT traffic monitoring for those ONT/ONU 104, 106 that do not report status. Status reporting DBA field 346 may be provided as status indications in the PLOu, in the DBRu as shown in FIG. 3, or in an ONU report in a DBA payload.

Status indications may be carried as four bits in the PLOu Ind field 320, and provide a report for each type of T-CONT 328, 330, 332, 334. Each bit may correspond to a different T-CONT type. If a bit is set for a particular T-CONT type 328, 330, 332, 334, the OLT 102 may assume there is some data waiting in one of the T-CONT buffers of that type. It is noted that T-CONT types 2, 3 and 4 328, 330, 332 may not have a fixed bandwidth component and any data waiting in those T-CONTs 328, 330, 332 causes the corresponding indicator to be set, whereas a T-CONT type 5 field 334 buffer may contain data belonging to a fixed bandwidth such that the presence of non-fixed bandwidth sets the corresponding indicator. The status indications provide an early warning to the OLT 102 that data is waiting, though it is not required that the OLT 102 DBA algorithm wait for such indications before allocating bandwidth to the ONT/ONU 104, 106 in order to avoid unnecessary delays. The OLT 102 may use the status indications for a fast alert that DBA supervision may be needed at the ONT/ONU 104, 106 without identifying the T-CONT 328, 330, 332, 334 or bandwidth detail.

Status reporting DBA in the DBRu field 310, shown in FIG. 3 as the DBA field 346, provides a continuous update of the traffic status of a particular T-CONT and is carried in the DBRu field 310 associated with the T-CONT. The status report in the DBA field 346 specifies the amount of data waiting in the T-CONT buffer corresponding to the allocation identification (Alloc-ID) that triggered the DBRu transmission. The OLT 102 may trigger the transmission of the DBRu by setting the DBRu field 260 in the Flags field 246 of a downstream transmission. The CRC field 348 protects the report in the DBA field 346 and DBRu structure with error correction and detection. The OLT may implement the error detecting and correcting functions associated with the CRC field 348 (e.g., CRC-8). If the CRC function indicates an uncorrectable error, the information in the DBRu field 310 may be discarded.

An ONU report in a DBA payload allows for the ONT/ONU 104, 106 to send a DBA report on any T-CONT in the transmission, and is carried in a dedicated DBA payload partition allocated by the OLT in the upstream. The ONT/ONU 104, 106 may select the T-CONT that is the subject of the report, and allows the OLT 102 to schedule a DBA payload which is generally smaller that that required to report on all the T-CONTs in the ONT/ONU 104, 106.

The upstream payload field 303 may be used to carry ATM cells, GEM-delineated frames or DBA reports. The ATM upstream payload includes a number of ATM cells from the ONT/ONU 104, 106 to the OLT 102, and the length of the payload is given by the duration of the allocation minus the size of any requested overhead. The ONT/ONU 104, 106 may buffer the ATM cells as they are provided by the OLT 102 and send them in burst during the allocated time. The OLT 102 receives the ATM cells, and may multiplex them with other bursts from other ONT/ONU 104, 106 and pass them to the OLT ATM client. The GEM payload contains any number of GEM frame-mode delineated frames, and the length of the payload is also given by the duration of the allocation minus the size of any requested overhead. The GEM protocol provides delineation of the user data frame (either going to or coming from a user) and provides port identification for multiplexing. As discussed above, delineation and port identification are accomplished by a GEM header, where the delineation process uses the GEM header at the beginning of every upstream GEM payload. As such, in an upstream transmission the OLT 102 is assured of finding the first header and may find subsequent headers using the PLI as a pointer. The DBA payload is discussed above, and contains a group of dynamic bandwidth allocation reports from the ONT/ONU 104, 106.

Figure 4A:
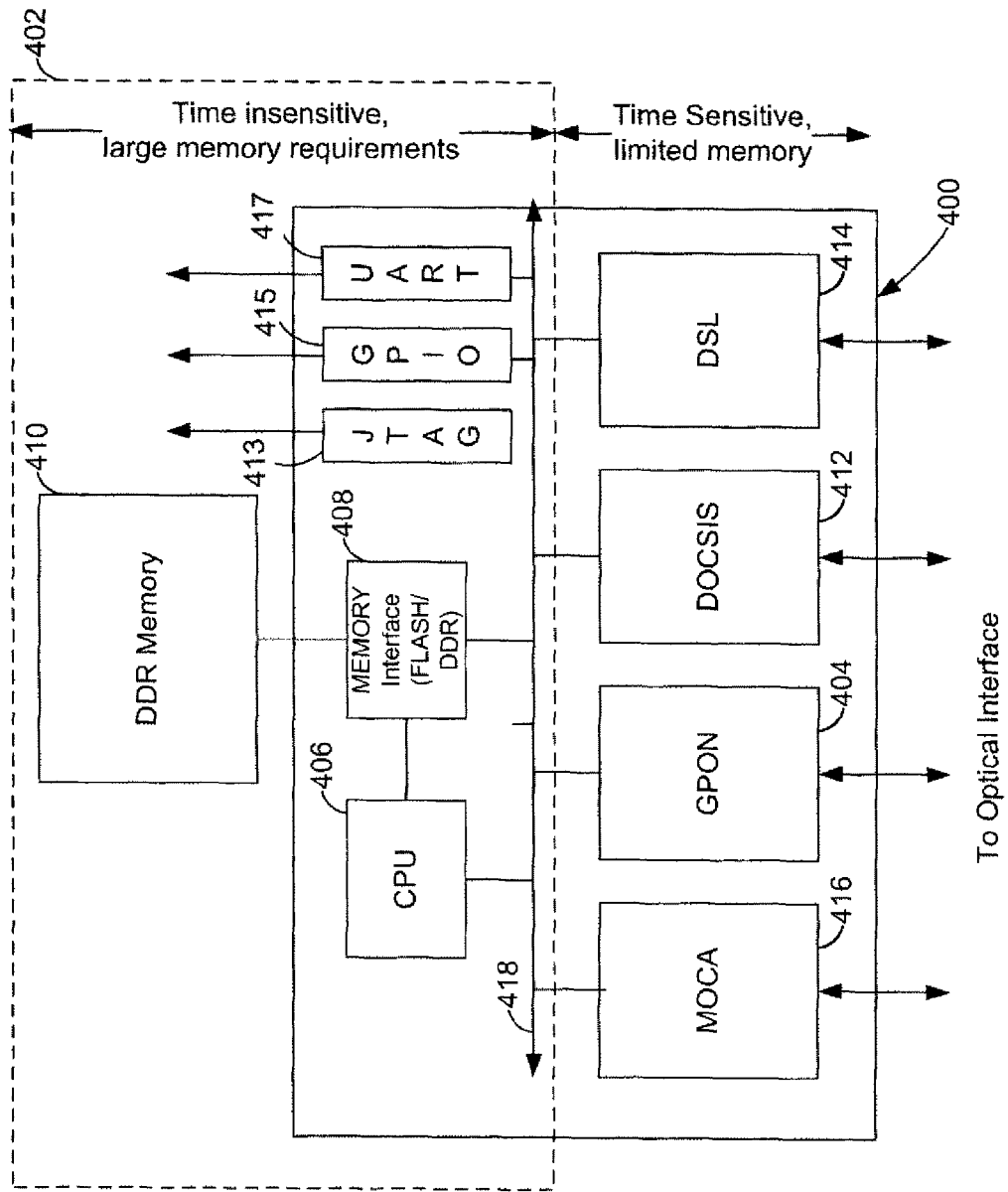
FIG. 4A is a block diagram of an example architecture of an integrated circuit within a passive optical network line termination unit.

FIG. 4A is a block diagram indicating an example of a general architecture 400 that may be implemented in the OLT 102 or the ONT/ONU to divide and execute time sensitive functions from non-time sensitive functions. Generally, the architecture 400 includes a sub-system 402 which may be used to execute non-time sensitive functions, such as those that require large memory requirements or low latency, and integrated circuits 404 having an embedded processor for performing time-sensitive functions, such as those that may only need limited memory. Time-sensitive versus non-time sensitive functions may be determined based on time threshold or response threshold requirements for processing the functions. For example, some functions, such as Media Access Control (MAC), may require immediate response (i.e., fast response threshold, time sensitive), whereas other functions, such as TCP/IP routing or packet processing, may not require an immediate response (i.e., non-time sensitive). It is recognized that in practice the actual response time for some non-time sensitive functions may be comparable to the response time threshold of time-sensitive functions. However, it should be understood that it is the response time requirements (e.g., time threshold requirements) that establish whether a function is time-sensitive or not, rather than the actual response time seen in practice. As such, the time threshold requirements delineating between time-sensitive and non-time sensitive are not necessarily predetermined or static, but are rather based on the allowable response time for executing the function.

As will be apparent from the discussions below in regards to FIGS. 5A and 5B, the integrated circuit 404 may perform a variety of time-sensitive functions depending on the information received at a receiver end of the circuit 404 and the information to be transmitted from a transmitter end thereof. In a GPON context, for example, these functions may include processing of various subfields in overhead data in a received transmission. The integrated circuit may pre-process these subfields prior to offloading payload information to the subassembly 402. The integrated circuit 404 may identify the corresponding incoming upstream transmission for the OLT and the location, length and value of the various subfields contained in the overhead field. On the transmitter side, the integrated circuit 404 may create the transmitted data overheads based on information from the receiver side as well as information (such as payload information) from the subassembly 402. In fact, one aspect of the architecture 400 is that in some examples information obtained from processing the received data may be used to directly control processing of transmitter data without resorting to offloading all such data retrieval and reconstruction to the subassembly 402. In this way, internal delays in a processing unit of a PON (e.g., an OLT) may be reduced. Further, because clock data recovery may be performed within the integrated circuit 404 and communicated directly with the transmitter within the integrated circuit 404, the architecture 400 may be used to more accurately correct for internal delays.

The subassembly 402 may be provided as part of a systems-on-a-chip (SoC) which may be re-usable for a variety of different implementations, including implementation of different integrated circuits as discussed below. As such, the subassembly 402 provides a "snap-and-run" architecture in which a variety of chips may be coupled to the subassembly 402, and the subassembly 402 is not limited to OLTs 102, ONTs 104 or ONUs 106, much less the example provided herein. The subassembly 402 may therefore be used to reduce the time-to-market chip assembly, as it can be used among a variety of chip designs and to build different chips.

Generally, the subassembly 402 includes an SoC processor 406 for processing the non-time sensitive functions and a memory interface 408 coupled to the SoC processor 406. A memory 410 is further provided and coupled to the memory interface 408 for buffering data from the integrated circuits 404 (e.g., packet buffering) and may include embedded memory management. The memory 410 thereby stores data for execution of non-time sensitive functions to be processed by the SoC processor 406. The SoC processor 406 controls the memory 410 and movement of data packets in and out of the memory 410 as needed.

The SoC processor 406 and the memory 410 are provided external to the integrated circuit 404 to support the processing of non-time sensitive functions while the processing of time-sensitive functions is handled by the integrated circuit 404. Accordingly, the SoC processor 404 and memory 410 may be used to minimize the amount of processing required at the chip level (e.g., packet level). That is, non-time sensitive functions that require additional processing complexity may be passed from the integrated circuits 404 to the subassembly 402. Different types of memories may be used for the memory 410, including double data rate (DDR) memory, flash memory, etc. The memory interface 408 may be provided as an interface corresponding to the memory 410 (e.g., a DDR memory interface, flash memory interface, etc.). The subassembly 402 may further include additional components, such as a debugging port (e.g., a joint task action group (JTAG) port 413), an input/output interface (e.g., a general purpose input/output (GPIO) 415), or a receiver and/or transmitter (e.g., a universal asynchronous receiver/transmitter (UART) 417), or other peripheral interfaces in different SoC embodiments. The devices 413, 415, 417, the memory 408 and the processor 406 are all coupled to a backplane bus 418 of the SoC subassembly 402.

As shown in FIG. 4A, the integrated circuit 404 may be a GPON chip 404 coupled to the subassembly 402, thus forming an SoC. The integrated circuit 404, which may be a GPON chip 404, communicates with the SoC subassembly 402 through an interface coupled to the backplane bus 418. Further disclosure of the GPON chip 404 is provided by way of example below. Generally, the GPON chip 404 includes an internal processor, and an SoC interface to the SoC subassembly 402 which interfaces with the SoC processor 406 and with the memory 410 via the memory interface 408. It should be understood that while the architecture 400 is described with reference to particular components, integrated circuits and particular transmission standards, the architecture 400 may be readily applied to different components and standards where time-sensitive and non-time sensitive functions may be applicable, including, but not limited to, wireless and wireline technologies.

While the architecture 400 may include only a passive optical network communicatively coupled to the SoC subassembly 402, the SoC subassembly 402 may be coupled to other types of networks or layers. For example, although the architecture 400 is shown to include a GPON 404 chip which interfaces with the passive optical network 100, it should be understood that different integrated circuits may be utilized in the architecture 400. As seen in FIG. 4A, additional or alternative technologies, such as Data Over Cable Service Interface Specifications (DOCSIS) 412, Digital Subscriber Line (DSL) 414 or Multimedia Over Coax Alliance (MOCA) 416 may be implemented and interfaced with wireline networks.

Figure 4B:
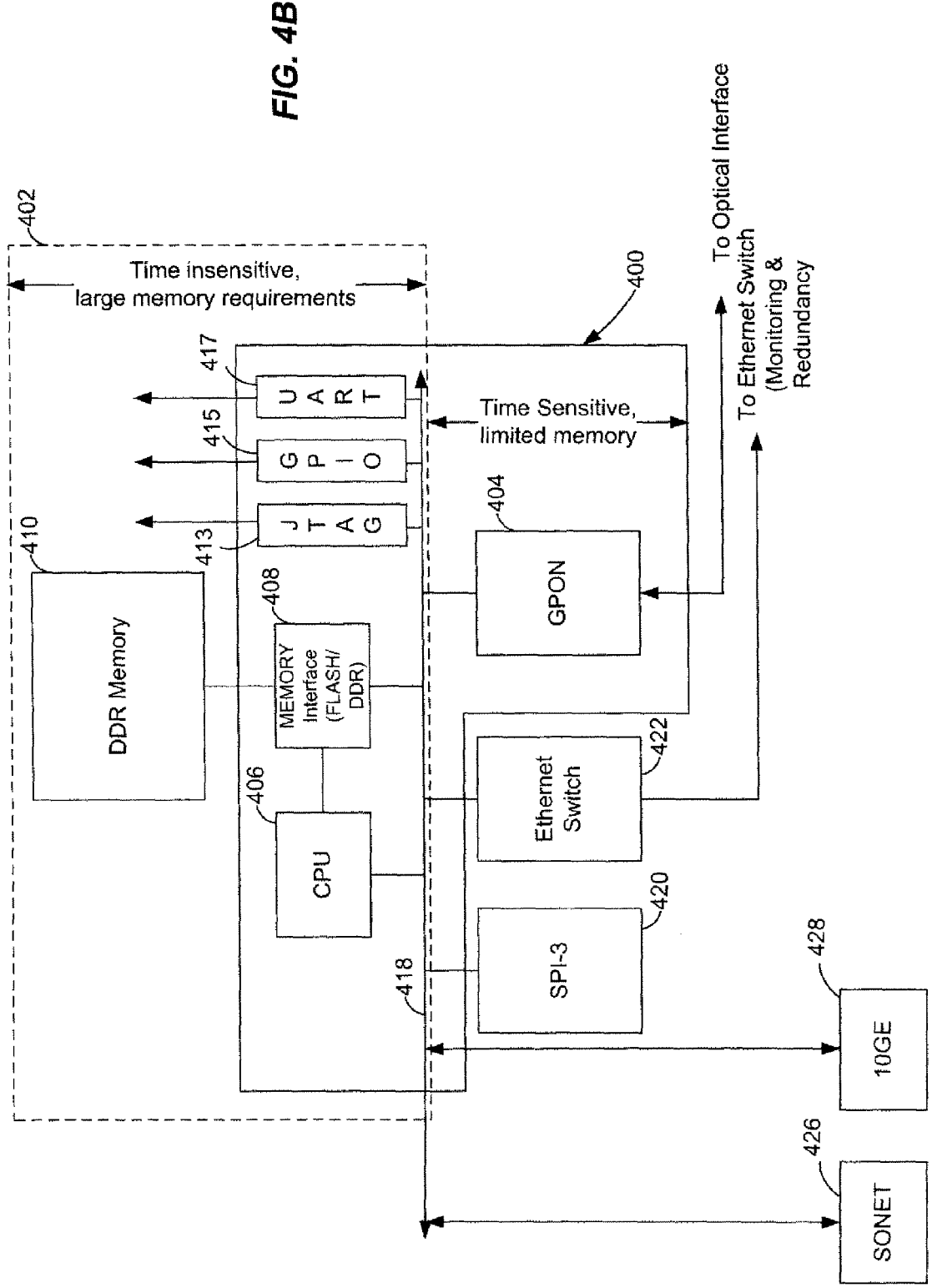
FIGS. 4B-4D are block diagrams of example architecture implementations of the integrated circuit configuration of FIG. 4A, and in the form of an optical line termination device, optical network termination device, and an optical network unit device, respectively.
Figure 4C:
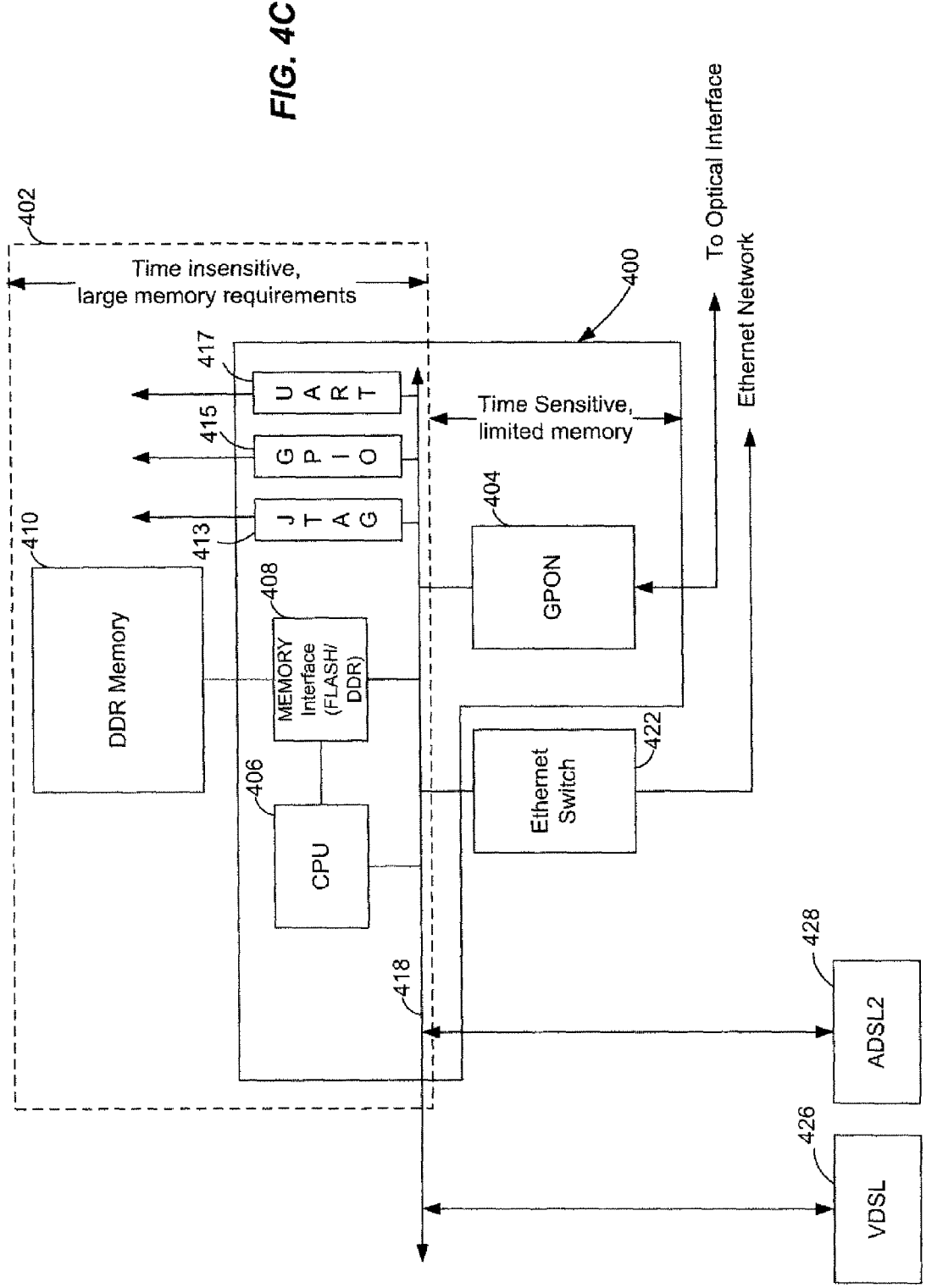
Figure 4D:
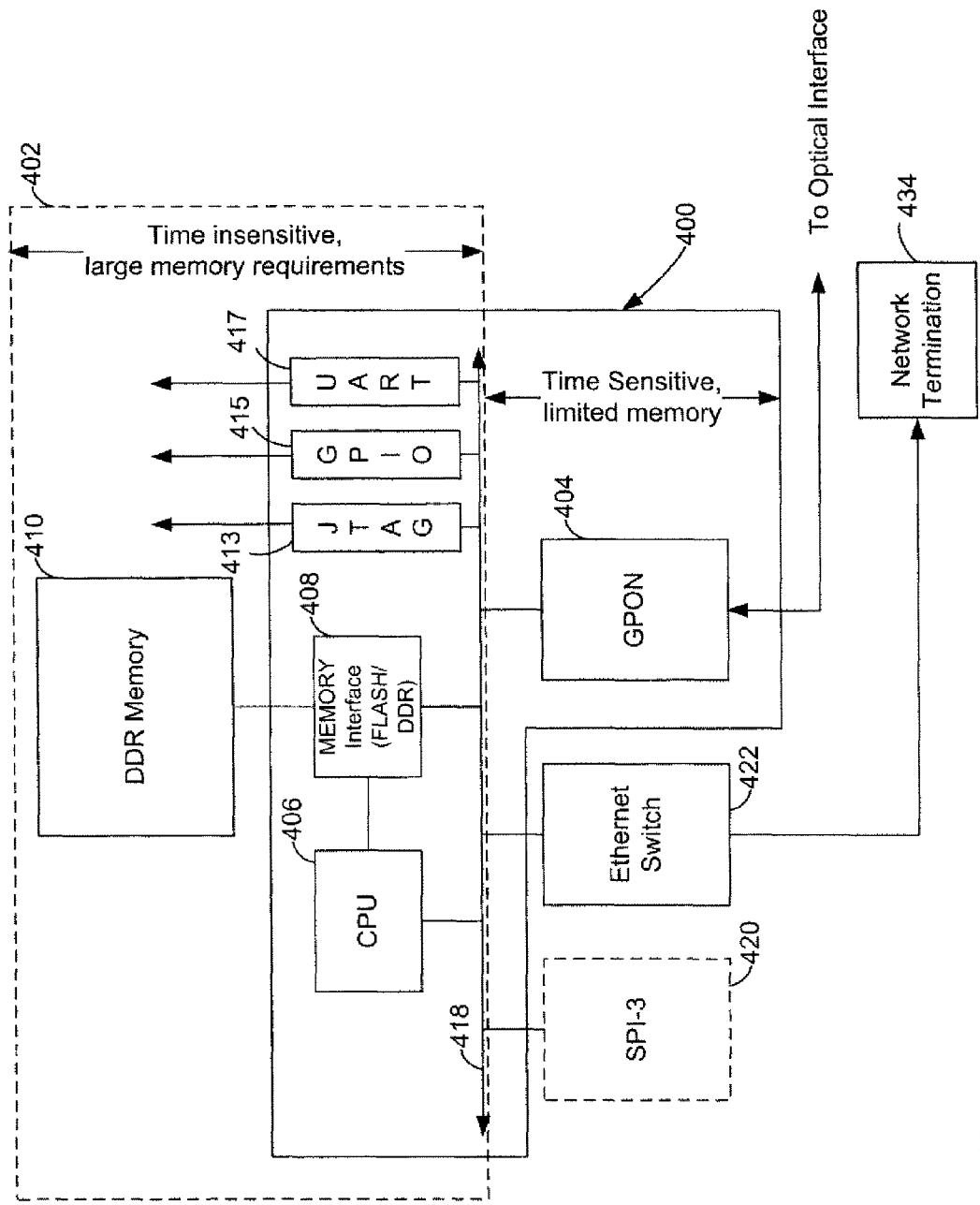

As further examples, the architecture may include an Ethernet switch interface circuit coupled to an Ethernet switch for monitoring and redundancy, a system packet interface layer 3 (SPI-3) circuit to interface with the backplane bus 418 of the SoC subassembly, a synchronous optical network (SONET), Ethernet (e.g., 10 gigabit Ethernet or 10GE), etc. Other layers may also be supported by the architecture. As seen in FIGS. 4B-4D, the SoC subassembly 402 may be coupled to a system packet interface level 3 (SPI-3) circuit 420 for chip-to-chip packet communications through a backplane. In some other examples, the SoC subassembly 402 may be coupled to an Ethernet switch 422, for example for monitoring and redundancy or for connecting to an Ethernet distribution network or network termination device.

FIGS. 4B-4D show example implementations of the architecture 400 used in an OLT, ONT, and ONU application, respectively. FIG. 4B, for example, shows an OLT application in which the SPI-3 circuit 420 is coupled to the backplane bus 418 as are a synchronous optical network (SONET) 426 and a 10 Gigabit Ethernet network 428. FIG. 4C shows an ONT application in which the backplane bus 418 couples the SPI-3 interface 420 to a very high density digital subscriber line (e.g., VDSL or VDSL2) distribution network 430 and an asymmetric digital subscriber line (e.g., ADSL or ADSL2) distribution network 432. FIG. 4D shows an ONU application, in which the SPI-3 interface 420 is optional and the Ethernet interface 422 is coupled to an Ethernet network termination 434, like the NT 108 shown in FIG. 1. Other layers may also be supported by the architecture 400. Generally, whenever a division of the time sensitive versus non-time sensitive functions is desired, each integrated circuit included in the architecture 400 may include an internal processor for execution of the time sensitive functions and an SoC interface to forward data packets for non-time sensitive functions to the sub-assembly 402 for execution therein.

Although many of the above examples have been described with reference to various wireline technologies, it should be understood that various wireless technologies may be utilized with wireless integrated circuits utilized in the architecture 400, such wireless technologies including, but not limited to, the Institute of Electrical and Electronics Engineers wireless local area network IEEE 802.11 standard, Worldwide Interoperability for Microwave Access (WiMAX), Ultra-wideband (UWB) radio technology, and cellular technology. Generally, whenever a division of the time sensitive versus non-time sensitive functions is desired, each integrated circuit included in the architecture 400 may include an internal processor for execution of the time sensitive functions and an SoC interface to forward data packets for non-time sensitive functions to the sub-assembly 402 for execution therein.

In the context of an OLT 102, the GPON chip 404 further includes a receiver for receiving upstream burst transmissions from an ONT/ONU 104, 106, a transmitter for assembling and transmitting downstream transmissions to the ONT/ONU 104, 106 and an optoelectronic interface to the passive optical network 100. The internal processor of the OLT 102 may therefore be used to perform time-sensitive functions associated with the OLT 102, such as assembling the overhead field 202 of a downstream transmission along with functions associated therewith, and processing the overhead field 302 of an upstream transmission along with the functions associated therewith. In the example provided below, the GPON chip 404 is described with reference to the upstream and downstream GPON transmission convergence frame formats discussed above. However, it is noted that the inclusion of an internal processor in the GPON chip 404 not only allows for execution of time sensitive functions, but also provides the flexibility to adapt the GPON chip 404 to changes in the GTC frame formats and other related GPON functions including MAC, etc.

Figure 5A:
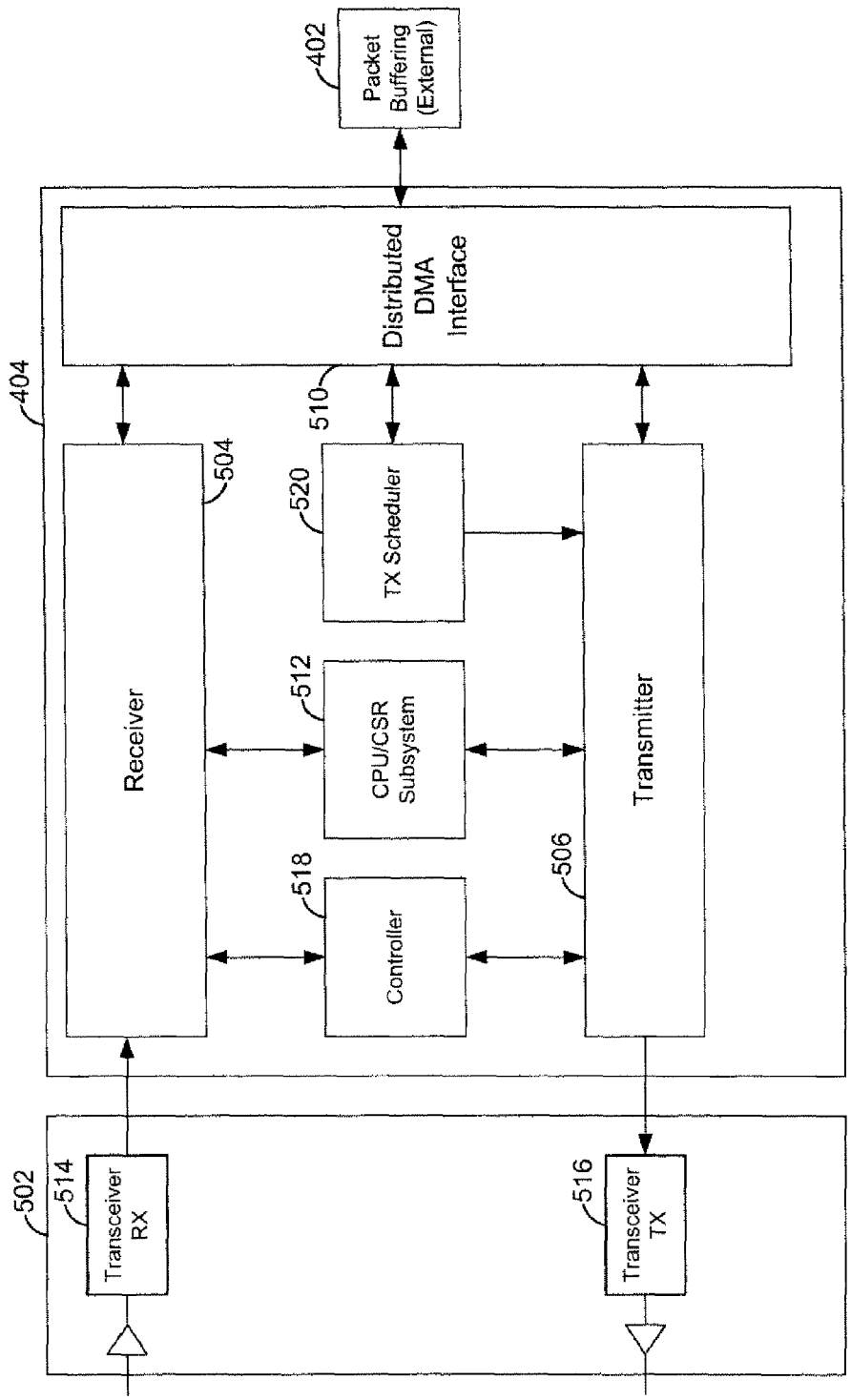
FIGS. 5A-5B are block diagrams of an example gigabit passive optical network chip of the integrated circuit within the passive optical network line termination unit, such as the example shown in FIG. 4A.
Figure 5B:
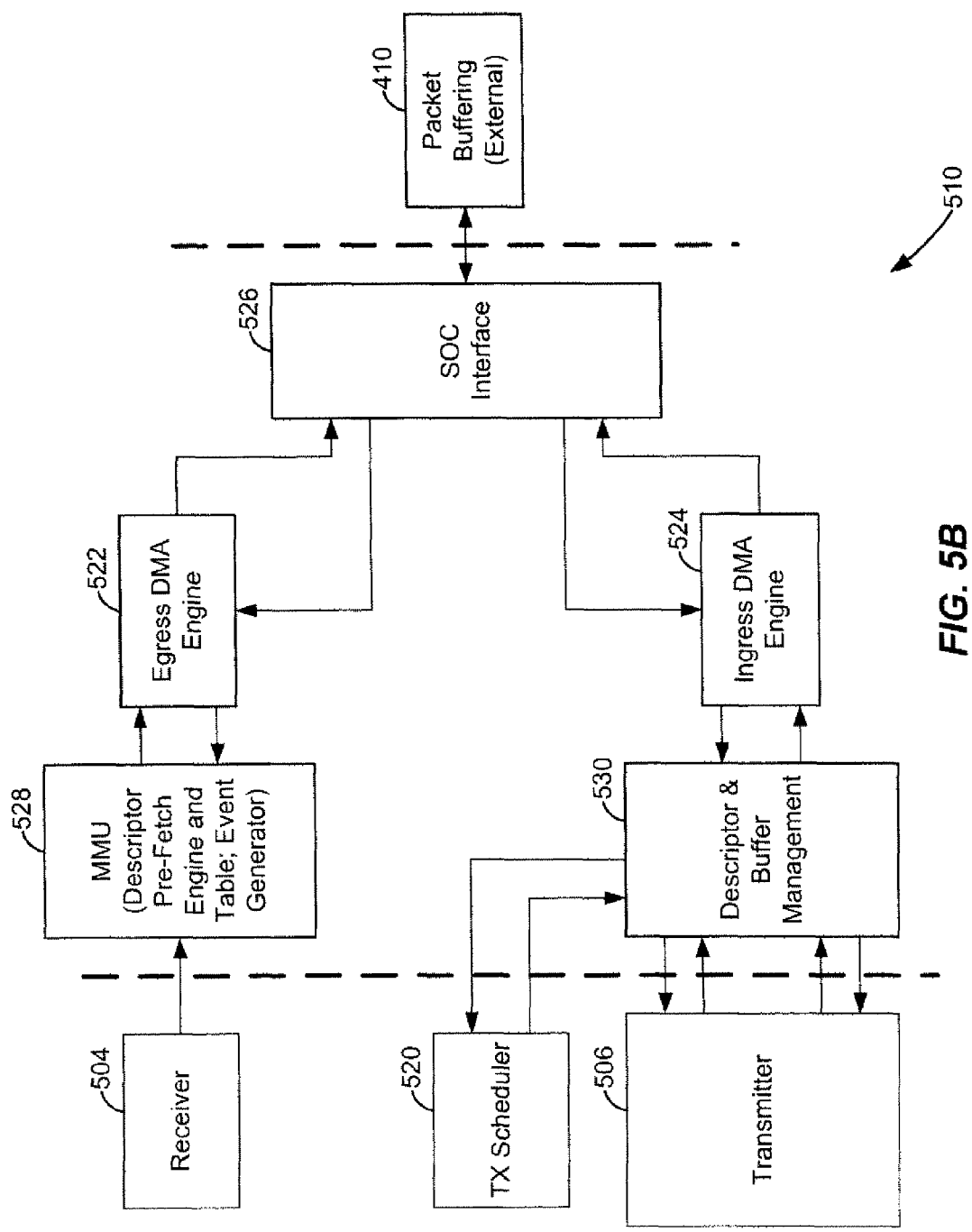

FIGS. 5A and 5B are block diagrams of an example of a general GPON chip 404 for an OLT 102, an ONT 104 or an ONU 106 shown in FIG. 4A, and will be described in the context of the GTC frame formats discussed above. In particular, the GPON chip 404 is coupled to the passive optical network 100 via an optoelectronic transceiver interface 502, and includes a receiver 504 for receiving upstream burst transmissions from an ONT/ONU 104, 106, a transmitter 506 for assembling and transmitting downstream transmissions to the ONT/ONU 104, 106 receiving transmissions over the passive optical network 100, a transmitter 508 for assembling and transmitting transmissions over the passive optical network 100, a distributed direct memory access (DMA) interface 510 to interconnect with the subsystem 402, and an internal processor 512 for processing time-sensitive functions associated with the transmission, such as processing the overhead of a transmission and assembling the frame of a transmission.

The optoelectronic interface 502 generally includes an optoelectronic transceiver receiver 514 coupled to the receiver 504, and an optoelectronic transceiver transmitter 516 coupled to the transmitter 506, though it should be understood that different optoelectronic interfaces may be used. The receiver 504 and transmitter 506 generally conform to the transmission format used by the OLT 102, the ONT 104 and the ONU 106, such as the upstream and downstream GTC frame formats provided above. In the case of an OLT 102, upstream GTC frame formatted data is transmitted from the ONT/ONU 104, 106 over the fiber 110, 112 into the transceiver receiver 514 and is provided to the receiver 504, and downstream GTC frame formatted data is transmitted from the transmitter 516 to the transceiver transmitter 516 for transmission over the fiber 110, 112 to the ONT/ONU 104, 106. Likewise, in the case of an ONT 104, or an ONU 106, downstream GTC frame formatted data is transmitted from the OLT 102 over the fiber 110, 112 into the transceiver 514 and is provided to the receiver 504, and upstream GTC frame formatted data is transmitted from the transmitter 516 to the transceiver 516 for transmission over the fiber 110, 112 to the OLT 102.

In particular, the GPON chip 404 further includes a controller 518, which may be a downstream bandwidth (DSBW) controller for an OLT 102 or a transmission framing controller for an ONT/ONU 104, 106, which interacts with the transmitter 506 and the internal processor 512 to control the transmissions of the transmitter 506. Generally, the controller 518 and the internal processor 512 enable various functions of the receiver 504 and the transmitter 506. For example, the internal processor 512 may be used to determine errors in the communication link between the OLT 102 and the ONT/ONU 104, 106, process or provide instructions related to PLOAM messages, perform functions related to PLOAM messages, allocate bandwidth, dynamic ranging and power transmission levels adjustment.

As further seen in FIG. 5A, the transmitter 506 is coupled to a scheduler 520, the controller 518 and the internal processor 512. The scheduler 520 may be a downstream transmission scheduler for an OLT 102 or an upstream transmission scheduler for an ONT/ONU 104, 106. Generally, the schedule 520 may be used for traffic shaping, bandwidth allocation and head-of-line (HOL) arbitration.

The distributed DMA interface 510 provides distributed management of the packet buffer (e.g., external memory 410). In particular, the distributed DMA interface 510 provides an interface to the sub-assembly 402, and may be implemented in any integrated circuit 404. Referring to FIG. 5B, the distributed DMA interface 510 includes an egress DMA engine 522 and an ingress DMA engine 524. The egress DMA engine 522 and ingress DMA engine 524 are coupled to an SoC interface 526. The egress DMA engine 522 is able to write data directly to the external memory 410 via the SoC interface 526. The ingress DMA engine 524 is able to read data directly from the external memory 410 via the SoC interface 526. As discussed above, the SoC processor 406 is responsible for non-time sensitive functions, the data of which is moved in and out of the memory 410 for processing by the SoC processor 406, and which may be provided from or provided to the integrated circuit 404 as needed. The DMA engines 522, 524 thereby provide DMA processing via CPU 406 control of the sub-assembly 402.

In the context of the GPON chip 404 of FIGS. 5A-5B, data written by the egress DMA engine 522 is provided by the receiver 504 via a memory management unit (MMU) 528. The MMU 528 and egress DMA 522 are provided with the responsibility of moving the information to the external memory 410. As discussed in greater detail below, the MMU 528 performs descriptor pre-fetching for incoming data packets, maintains a lookup table to determine the destination location of a data packet in the memory 410 and generates events for reporting to the subassembly 402. Generally, the egress DMA engine 522 notifies the MMU 528 when it is ready to read data, and the MMU 528 manages access of the egress DMA engine 522 to the external memory 410 and provides the data to be written to the external memory 410.

Data read by the ingress DMA engine 524 is provided to the transmitter 506 via a descriptor and buffer management unit 530. The descriptor and buffer management unit 530 may provide frame status data to the scheduler 520, and may be controlled by the scheduler 520. Generally, the descriptor and buffer management unit 530 manages access of the ingress DMA engine 524 to the external memory 410. In particular, ingress DMA engine 524 notifies the descriptor and buffer management unit 530 when it is ready to receive data for transmission, and the descriptor and buffer management unit 530 notifies the ingress DMA engine 524 it is ready to receive the data.

The distributed DMA interface 510 is provided with sufficient memory within the GPON chip 404 to pass information in and out of the GPON chip to a larger external memory by virtue of the MMU 528 and the descriptor and buffer management unit 530. In particular, the GPON chip 404 is able to pass data associated with memory-intensive and/or processor-intensive functions that have low time sensitive requirements (e.g., client payload data) to the external SoC processor 406 and memory 410, and reserve the internal processor 512 for time-sensitive functions, such as processing upstream transmission frame and assembling downstream transmission frames.

Figure 6:
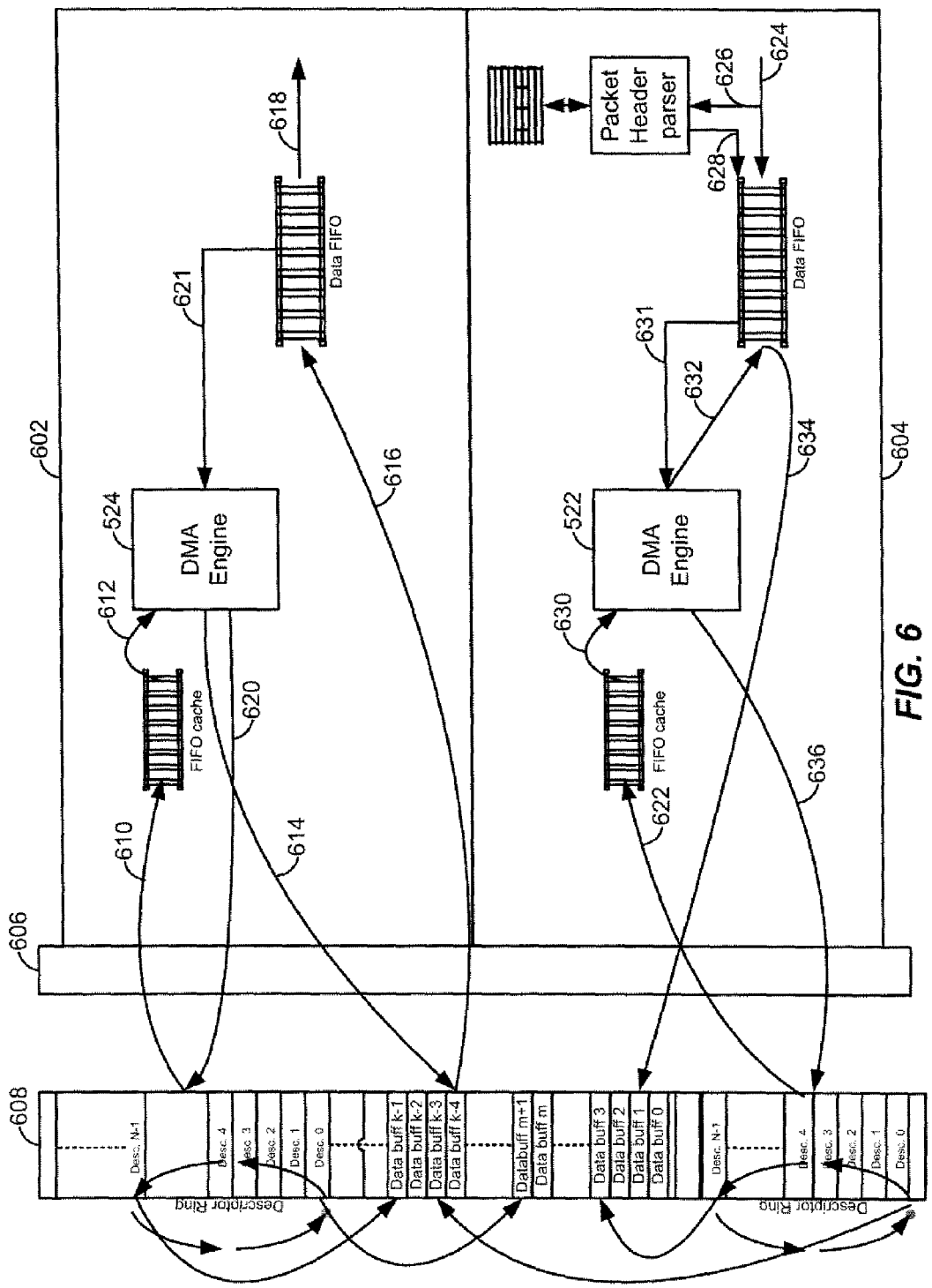
FIG. 6 is a block diagram of an example of buffer management and handling of data packets between a receiver or transmitter and a host.

FIG. 6 is a block diagram depicting an example of buffer management and handling of data packets between a receiver 504/transmitter 506 and a host, such as the subassembly 402. Although the following discusses buffer management and data packet handling in the context of passive optical network and in particular in the context of gigabit passive optical networks, the disclosure is not limited thereto and the buffer management and data packet handling may be applicable to any situation in which descriptors are used to move data in and out of memory.

Referring to FIG. 6, an example of a transmit data path 602, a receive data path 604 and a control plane 606 are shown. Generally, the transmit data path 602 and the receive data path 604 are described in the context of a hardware implementation, such as the distributed DMA interface 510, whereas the host is described in the context of a host memory, such as the external memory 410, one or more processors, such as the SoC processor 406, and software associated therewith, such as a software driver. As discussed below, the buffer management and handling of data packets is performed as a series of writes, as opposed to a series of reads, between the host and the hardware in order to reduce latency for both transmission and receiving operations. The control plane 606 may include many of the components shown in FIGS. 4A-4D, with the exception of the integrated circuit 404.

The transmit data path 602 may include function blocks including transmit queuing, transmit data, transmit cache and transmit events. The transmit queuing includes data transmission caches (e.g. data FIFOs) and descriptor cache (e.g., FIFO cache). The transmit data block may manage data writing into the caches, and may include a DMA controller, data multiplexing and cache write controllers. The transmit cache block may include a cache for each DMA engine with a different DMA engine for each type of data packet (e.g. each type of T-CON), although it is noted that only one DMA engine is shown in the transmit data path 602. The transmit of the block may include a transmit event generator.

The receive data path 604 may include function blocks including receive packet processor, receive filter, receive cache, and receive data control. The received packet processor block may classify and process received data packets based on the data packet Port-ID, as discussed further below. The receive packet processor block may further generate events if the data packet contains errors, as also discussed further below. The receive filter block may receive the Port-ID filtering and lookup, and may contain a filter/lookup table and perform hashing and searching to identify the destination associated with the Port-ID. The receive cache block may include a data reception cache (e.g. receive data FIFO) with control word. The receive data control block may include a receive data controller and manages descriptor caches and buffers (e.g., FIFO cache).

Referring to the transmit data path 602, a host software driver is aware of the number of data packets to be transmitted, and the host memory includes a descriptor ring having a descriptor for each data packet to be transmitted. In the case of large data packets, the data packet may be fragmented with a descriptor associated with each data packet fragment. The host software is able to access the blocks shown in the transmit and receive data paths 602, 604 through a Gigabit bus or other bus interface, through an SoC bus (not shown) and to/from the blocks.

Knowing the number of data packets to be transmitted, the host 608 writes the descriptors of the corresponding data packets for transmission to a descriptor ring cache, shown in the transmit data path as a Fast In Fast Out (FIFO) cache. In particular, the host 608 pushes in the descriptors into the descriptor ring cache (see path 610). In one example, the host 608 may push in the entire descriptor ring, including all descriptors therein, associated with a particular data transmission queue, as discussed further below.

The DMA engine 524 reads the descriptors from the descriptor ring cache (see path 612) and deciphers the location of the associated data packet in the host memory, the size of the data packet and any transmission priority associated with the data packet. For example, data packets that may require transmission in real-time, such as audio or video data packets, may receive a higher transmission priority than Internet data packets. Thereafter, the DMA engine 524 activates direct memory access to the host memory where the packet resides (see path 614) and initiates a buffer transfer from the host 608 to a transmission data buffer, shown in FIG. 6 as a data FIFO.

The DMA 524 writes the requested data packet(s) to the transmission data buffer (see path 616). The transition data buffer caches the data packet written from the host memory and processes (e.g. transmits) the cached data packet out of the data transmission buffer (see path 618). In the event a data packet is received having a higher priority than a previous data packet being cached in the data transmission buffer, the hardware may interrupt transmission of the previous data packet, for example by implementing DMA arbitration. Alternatively, the data transmission buffer may be provided as multiple data transmission buffers, each associated with a particular priority such that a data packet is written to the appropriate data transmission buffer according to its transmission priority.

The data transmission buffer updates the DMA engine 524 as to the status of the buffer (see path 621). In particular, after a data packet has been processed (e.g. transmitted) the DMA engine generates return pointers that are written to the host memory (see path 620). The return pointers indicate that the descriptor has been read from the descriptor ring cache and the corresponding data packet has been transmitted.

In order to reduce traffic between the hardware and the host 608, the return pointer may refer to the last descriptor read from the descriptor ring cache. Because descriptors within a descriptor ring are consecutive, and because the host 608 writes the descriptors to the descriptor ring cache, the host 608 is aware of the last descriptor that may be read from the descriptor ring cache. As a result, the host 608 is able to read the return pointer referring to the last descriptor read from the descriptor ring cache and understand that all descriptors have been read from the descriptor ring cache, and the host understand exactly how many data packets have been processed as a result. Accordingly, the host 608 may push new descriptors into the descriptor ring cache. Alternatively, a return pointer may refer to a batch of descriptors or return pointers for each descriptor may be batched and returned to the host 608. As discussed further below, events may be generated by the hardware, including an event to write the return pointers to the host 608.

Referring to the receive data path 604, the host pushes descriptors of a descriptor ring from the host memory into a descriptor ring cache (see path 622), shown in the received data path as a FIFO cache. In one example, the receive data path 604 may include several descriptor ring caches, each corresponding to a different transmission rate (e.g., different bandwidths), in order to accommodate data packets having different transmission requirements (e.g., priorities). Each descriptor ring cache may then correspond to a receive queue within the host memory.

Upon receiving a data packet (see path 624), the hardware parses the header of the data packet (see path 626) in order to determine a destination within the host memory for the data packet (e.g., a data reception queue). In the case of multiple descriptor ring caches, the hardware may also determine the appropriate descriptor ring cache for the data packet based upon its destination within the host memory. In particular, a Port identification (e.g., Port ID 274) may be read from the header and a lookup table may be utilized to match the Port identification with the data packet's destination (e.g., Queue ID), based on the assumption the destination is able to receive the data packet. Once the destination has been determined, the destination data along with the header are cached in the data reception buffer (see path 628). In one example, the destination data and the header are cached in the data reception buffer simultaneously with the data packet received along path 624.

The data reception cache periodically updates the DMA engine 522 with its status (see path 631). The DMA engine 522 will read a descriptor from the descriptor ring cache (see path 630). According to the descriptor, the DMA engine 522 reads the data from the data reception buffer (see path 632), and the data packet is written to the host memory according to its destination via control of the DMA engine 522 direct memory access (see path 634). Once the data has been written to the host memory, the DMA engine 522 triggers an event to writes a return pointer to the host 608 indicating that the data packet has been written to the host memory (see path 636). As a result, the host 608 does not need to read the data from the data reception buffer, but may be notified once the data has been written to the host memory.

At the same time the data packet is written to the host memory, the DMA engine 522 may check the integrity of the packet by including a CRC block reading a checksum value (e.g. CRC) from the header of the packet (see path 631). If the DMA engine 522 determines that there is anything wrong with the data packet, an event may be generated and sent to the host 608. Accordingly, the host 608 may be informed of any problems associated with the data packet as the data packet is received and they process the data packet accordingly without being burdened with the processing requirements associated with evaluating the integrity of the data packet.

As is known, GPON utilizes different bandwidth requirements. A standardized system generally includes a normal line rates (downstream/upstream) according to the following table:

| Downstream | Upstream |
|---|---|
| 1244.16 Mbits/s | 155.52 bit/s |
| 1244.16 Mbits/s | 622.08 bit/s |
| 1244.16 Mbits/s | 1244.16 bit/s |
| 2488.32 Mbits/s | 155.52 bit/s |
| 2488.32 Mbits/s | 622.08 bit/s |
| 2488.32 Mbits/s | 1244.16 bit/s |
| 2488.32 Mbits/s | 2488.32 bit/s |

At a 2.448G data rate, back-to-back 64-byte packets arrive every 221.83 ns, as shown in the following equation:

$$((64\text{-byte}*8\text{-bit})+40\text{-bit-over-head})*(1/2.488 \text{ ns}) = 221.83224 \text{ ns}$$

With host logic running at 155.5 MHz, there are 34 cycles for each packet to be processed at 16-bit bus width. In order to match an SoC configuration, 32-bit bus, the data packets may be packed into 32-bit before storing in the data reception cache. As a result, regardless the bus width, there are plenty of cycles for the packet header parser show in FIG. 6 to do filtering and lookup and then write back to data reception cache's control word. For upstream burst transmissions, the same bandwidth may be met with a 32-bit cache running at 155.5 MHz.

Every data packet that is received has a destination within the host memory, which is determined upon receipt of the data packet in the receive transmission path 604. As such, the receive transmission path 604 may include a receive filter block for data packet filtering and parsing the header of the data packet to determine the data packet's destination and determine the data packets requirements. Generally, the receive filter provides hardware de-multiplexing which allows incoming packets to be delivered safely to destinations within the host memory (e.g., pre-configured data reception queues or buffers) based on the port ID of the data packet header. The filtering may act solely on the port-ID of the incoming data packet and may send no-match or wrong port-ID to a default reception queue in the host memory. In one example, a series of filter table lookups are conducted by hashing until the maximum number of lookups is reached. If a matched entry is found, the Queue ID is returned. Otherwise, the Queue ID for a default queue may be used for sending the packet to the default queue.

The filter may support a maximum 4 k Port-ID with a minimum packet interval of 34 clock cycles when running at 155.5 MHz. The Port-ID filtering design may support the following: (1) the time for average number of lookups for each packet is less than the average packet-to-packet interval; and (2) for most of the packets (e.g., greater than >99%) the match is found within the maximum number of lookups as long as the connection has been established in the filter table.

Based on the above analysis, there may be a limited time for searching within 30 cycles. If the filtering table size is 128 entries, then the parameters are met. This may be the likely case, because the chance of consecutive minimum packets back to back is relatively rare, and the actual parameters may be more relaxed than those provided above. Further, there may be few Port-IDs that need to be supported, so the size of filtering table may be much smaller than that described above.

In performing data packet filtering and parsing, when a data packet is received, the packet header parser shown in FIG. 6 parses through the packet header to classify the packet type. This process may involve filtering the Port-ID or even looking into the Ethernet packet header as required, such as looking for IPv4, IPv6, Layer 2 filtering, etc. In one example, invalid entries are written with all zeros by software, which may be done during the GPON initialization. Obsolete entries may also be removed by marking them with zeros to avoid false match during filtering. A Queue ID (e.g., a 5-bit Queue ID) is associated with each entry, and supports up to 32 data queues in the host memory. The Queue ID may be longer than 5-bits if more data reception queues are provided in the host memory. An example of a filter table is shown in the table below, and may be implemented by a single small memory or register file:

| | n | Port-ID 12-bit | DA N-bit | SA M-bit | Queue-ID 5-bit | Next Pointer |
|---|---|---|---|---|---|---|
| | N-1 | Port-ID 12-bit | DA N-bit | SA M-bit | Queue-ID 5-bit | Next Pointer |
| | N-2 | Port-ID 12-bit | DA N-bit | SA M-bit | Queue-ID 5-bit | Next Pointer |
| | N-3 | Port-ID 12-bit | DA N-bit | SA M-bit | Queue-ID 5-bit | Next Pointer |
| | : | : | : | : | : | : |
| | : | : | : | : | : | : |
| K bins | 3 | Port-ID 12-bit | DA N-bit | SA M-bit | Queue-ID 5-bit | Next Pointer |
| | 2 | Port-ID 12-bit | DA N-bit | SA M-bit | Queue-ID 5-bit | Next Pointer |
| | 1 | Port-ID 12-bit | DA N-bit | SA M-bit | Queue-ID 5-bit | Next Pointer |
| | 0 | Port-ID 12-bit | DA N-bit | SA M-bit | Queue-ID 5-bit | Next Pointer |

The filter table is processed after a hashing function which can result in K possible bin entries. Each bin entry includes a filter table as shown above. On each filter table, the Port-ID/DA/SA fields are used to see if a match with the incoming packet identifiers exist. If a match exists, then the Queue-ID region indicates where the packet should be stored. If a match does not occur, the Next pointer field indicates which entry in the filter table should be compared next. The Next-pointer field effectively forms a link list of valid filter table entries.

Figure 7:
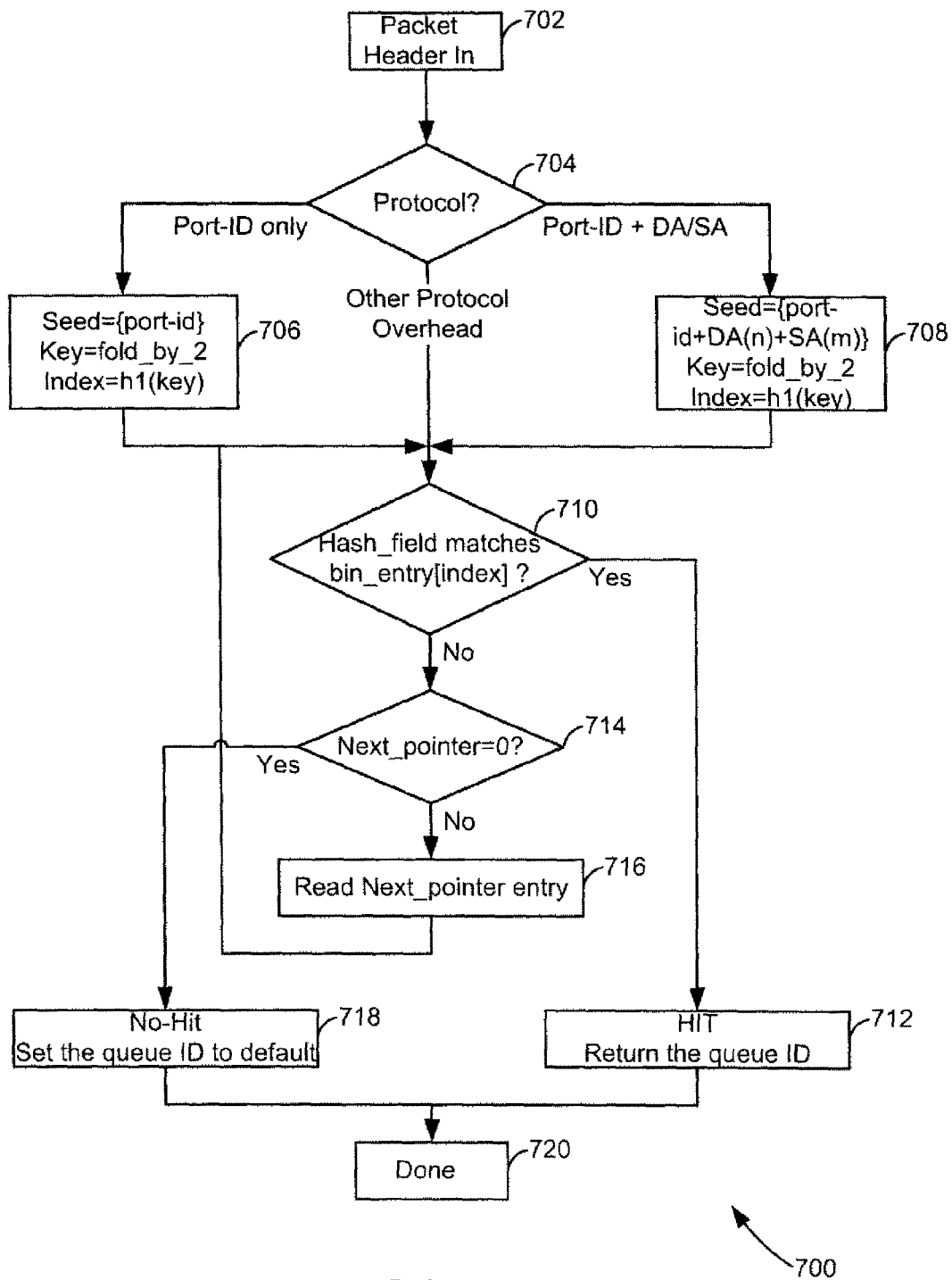
FIG. 7 is a flow diagram of an example of a routine for parsing a header of a data packet to determine a destination in the host memory.

FIG. 7 is an example of a receive packet filter table search routine 700, which may be utilized to parse the header of an incoming data packet and determine the destination queue within the host memory. Beginning at block 702, a data packet header is read by the parser, and at block 704 the parser determines if the packet header is to be steered according to the Port-ID, Port-ID and DA/SA or no steering protocol. If by Port-ID only, the routine 700 proceeds to block 706 to initiate the hashing seed to the Port-ID, set the hash key and set the index to the first hash function based on the hash key. The routine 700 then proceeds to block 710. If by Port-ID and DA/SA, the routine 700 proceeds to block 708 to initiate the hashing seed to the Port-ID and DA/SA, set the hash key and set the index to the first hash function based on the hash key. The routine 700 then proceeds to block 710. If neither protocol is utilized, the routine 700 passes directly to block 710, for example to look into the packet header for IPv4, IPv6, Layer 2 filtering, etc.

At block 710, the routine 700 considers an entry in the filter table and determines if the hash field matches one of the K bin entries (see filter table above). If so, the parser reads the Queue ID and return a hit at block 712. Otherwise, the routine 700 determines if the point has reached the end of the filter table at block 714 by checking the Next Pointer field of the filter table. If not, the routine 700 moves the pointer to read the next valid entry (Next Pointer is not zero) in the filter table tables, and repeats the match determination at block 710. If the pointer reaches the end of the table as determined at block 714, the routine 700 returns a no hit at block 718 and sets the Queue ID to that of the default queue. After at hit, or after determining there is no corresponding Queue ID for the data packet, the routine 700 terminates at block 720 until the next packet arrives.

Examples of hash fields for Port-ID only and Port-ID with DA/SA are shown in the following table where, for instance, the Port-ID filed is kept intact, and a limited number of bits [m:n], 10 bits in this case), is picked from the DA and SA fields:

| Type | bit[31:20] | bit[19:10] | bit[9:0] |
|---|---|---|---|
| Port ID only | Port-ID[11:0] | 0 | 0 |
| Port ID plus DA/SA | Port-ID[11:0] | DA[m:n] | SA[m:n] |

As indicated at blocks 706 and 708, the hash key may be formed by folding the 32-bit hash fields by 2 to 16 bits. The first hash function may be implemented through the Linear Feedback Shifting Register (LFSR) sequence with polynomial $X16+X3+1$ on the 16-bit key. The 4 LSB is the hash function output, which randomizes the key so that even packets sharing same DA/SA address or Port-ID number are not likely to be mapped into the same index or bin. In an alternative implementation, the hash function may be done in one cycle by flattening the serial shift into parallel XORs of a 32-bit key.

A buffer table stores the physical addresses of the buffers in the host memory 608 used by the DMA engine 524 in the transmit path and the DMA engine 522 in the receive path. The buffer table below shows the buffer ID that may be used to define the buffer queues where descriptor rings can be implemented.

| Field | Half Buffer Table Mode # Bits | Description |
|---|---|---|
| buf_addr | 20 | Buffer physical address. upper 20 bits of 32-bit address. With a minimum 4K buffer size, 12 lower bits are dropped to leave 36 bits. |
| owner_id | 12 | Buffer owner ID. |
| rsvd | 0 | |
| Total | 32 | |

Figure 8:
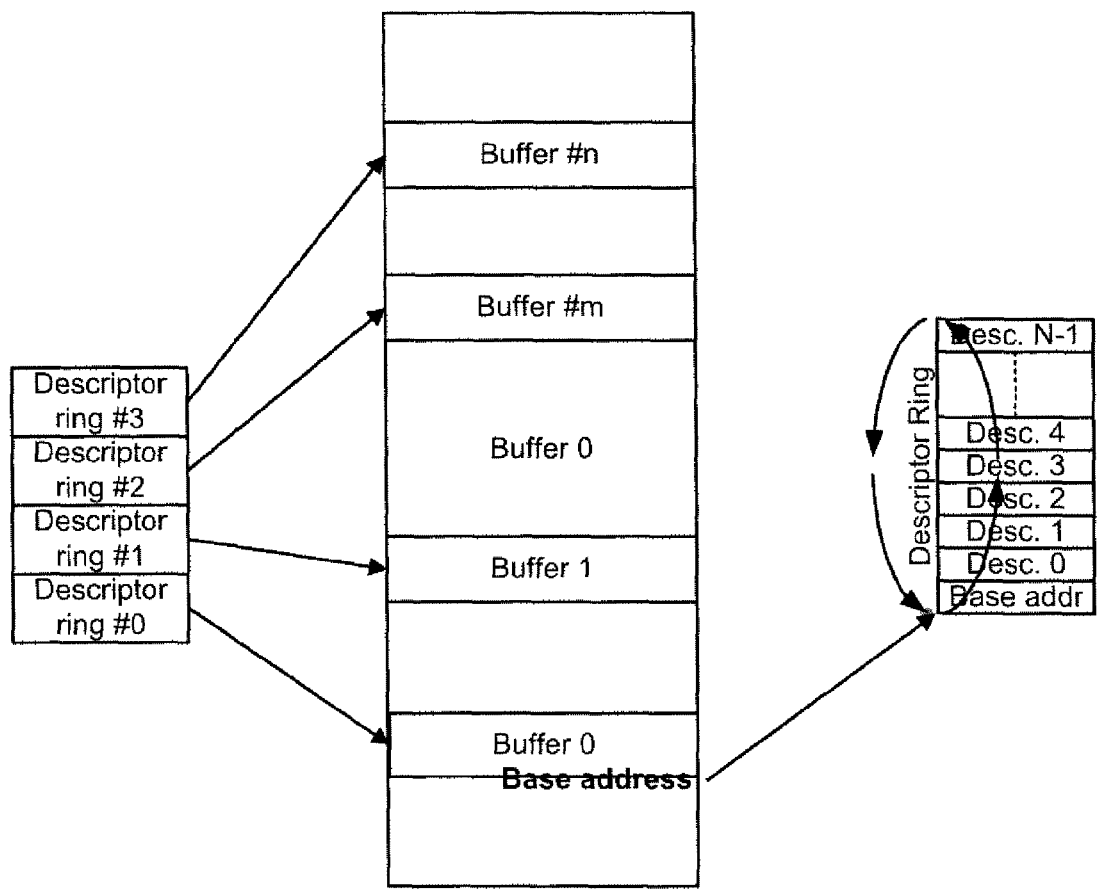
FIG. 8 is a schematic diagram of descriptor queues and descriptor ring structure in a host memory.

Descriptor queues in the host memory may be formed using buffers pointed to by buffer IDs as in the buffer table. For large descriptor queue sizes, multiple buffers may be utilized. The buffer IDs used to create descriptor queues are generally consecutive so that only one buffer ID is passed to hardware, as shown in FIG. 8. In the example shown in FIG. 8, 4 descriptor rings are shown, each with its own buffer in the host memory. In one example, each buffer in the host memory is a page of 4 k bytes in size.

Although shown in separate data paths, the transmit and receive DMA mechanisms may be provided with similar implementations. The host 608 may create a descriptor ring for each descriptor queue in the host memory. In one example, the size of each ring may programmable up to 1K descriptors. Generally, the host utilizes separate transmit and receive queues. The hardware for the transmit and receive data paths 602, 604 implements a descriptor cache for each DMA queue. A small number of descriptors (e.g., 8, 16 or 32) may be cached, though a cache size of 64 or more may also be utilized. The cache is used as a descriptor cache and one entry is mapped into that queue's page-aligned address space control.

As discussed above, a method for utilizing descriptor ring pushes from the host 608 and hardware physical address calculation followed by data transfer is utilized. The host 608 pushes descriptors to minimize initial latency, and the hardware of the transmit and receive data paths 602, 604 process the descriptors and transfers data to reduce processor overhead, for example of the SoC processor 406. In particular, the host 608 writes the descriptors into the descriptor ring cache inside the hardware. Batches of descriptors may be pushed in after a batch of descriptors have been set up to further reduce the processor overhead. The hardware, and in particular the DMA engines 522, 524, may be implemented such that they will be alerted when any descriptors are pushed inside the descriptor ring cache. Once alerted the descriptors are read out the descriptor ring cache and DMA operations are initiated to move packets across the transmitter 602.

The host 608 may typically push the descriptors into the descriptor ring cache after a reset (e.g., cache empty event) or after the transmitter/receiver has been idle for a predetermined period of time. However, the host 608 should be informed of the completion descriptor pointers (return pointers) indicating the descriptors which have been consumed by the DMA engines 522, 524 to verify there are available slots in the descriptor ring cache for reuse. As such, when the last descriptor is used in either the transmission or reception descriptor ring, the hardware sets a "descriptor queue empty" bit in the completion event. The host 608 may use this to trigger a descriptor and write pointer push when new descriptor(s) become available.

On the receive data path 604, a descriptor queue empty event may also be used as a warning to the host 608 that new data packets destined for the descriptor queue will be discarded. The hardware may not generate any more events regardless of the number of data packets that arrive and get discarded until the host 608 posts a new descriptor. This prevents a burst of data packets from generating enough events to overflow the event queue.

The hardware (602, 604) further maintains transmission and reception descriptors in a pointer table to store related information for each required descriptor ring which fits within a descriptor queue. The descriptor tables may be implemented on-chip. An example of the transmission descriptor pointer table is given below:

| Field | Width | Description |
|---|---|---|
| q_size | 2 | 4 options, |
| | | 00-128 |
| | | 01-256 |
| | | 10-512 |
| | | 11-1k |
| q_base | 20 | Descriptor ring base address, 4k aligned |
| Total | 22 | |

An example of the reception descriptor pointer table is given below:

| Field | Width | Description |
|---|---|---|
| jumbo_mode | 1 | 0: standard 1.5K Ethernet MTU |
| | | 1: jumbo 9K MTU |
| | | For a queue in jumbo mode, hardware writes data at the given offset until end-of-packet or end-of buffer is reached. If there is more packet data, another descriptor is used. |
| | | Hardware provides a "cont" bit in the receive event to indicate this buffer does not contain end-of-packet byte and that the next buffer is chained. |
| q_size | 2 | 4 options, |
| | | 00-128 |
| | | 01-256 |
| | | 10-512 |
| | | 11-1k |
| q_base | 20 | Descriptor ring base address, 4k aligned |
| Total | 23 | |

Receive descriptor rings are formed within a descriptor queue by using the receive descriptor as shown below on this table:

| Field | Width | Description |
|---|---|---|
| buf_addr | 20 | Buffer physical address. |
| | | Support 32-bit address mode, 4k in size. |
| Descriptor-ID | 10 | It is SW's responsibility to ensure the size fits within the allocated buffer space control. |
| | | Hardware does not check against page boundary crossings. |
| Total | 0 | |

In reference to FIG. 8, the Desc0 to DescN−1 values will correspond each to one of the above table formats in the reception mode.

The size of the receive descriptor cache may depend on the number of queues in the host memory and the number of cached entries per queue. In one example, a maximum of 32 entries is supported. With 16 queues, 2 Kbytes are utilized, but may be reduced if only few queues are utilized.

Transmit descriptor rings are found within the descriptor queue by using the following transmit descriptor as shown below on this table:

| Field | Width | Description |
|---|---|---|
| Port_id | 12 | Port ID |
| cont | 1 | Continuation. Indicates this buffer does not contain end-of-packet byte. |
| buf_addr | 20 | Buffer physical address. 4K aligned |
| byte_cnt | 12 | Number of valid bytes. |
| Total | 44 | |

In reference to FIG. 8, the Desc0 to DescN−1 values will correspond each to one of the above table formats in the reception mode.

In one example, the transmit descriptors are 8-byte aligned in host memory. The size of the transmit descriptor cache may depend on the number of queues in the host memory and the number of cached entries per queue. In one example, a maximum of 32 entries is supported. With 5 queues, up to 960 bytes are utilized and may reside inside the chip.

As indicated above, different data packets (e.g., different T-CONTs) may have different transmission rates beyond those allowed by the receiving station (e.g., OLT, ONT, ONU). While OLT protocol may handle the upstream burst rate by adjusting the burst window, the following provides an alternative or additional method that helps the T-CONT to generate meaningful DBRu indication to OLT. In particular, a rate control is implemented, which may be implemented in software or hardware. However, it is noted that software-based rate control may add significant overhead, because after sending each packet to the hardware, the software would set a timer and wait for the timer to expire before sending another packet. As such, it may be preferable to queue all the packets into hardware to control the packets transmitted out, which may be implemented as a rate control engine.

The rate control engine may manage only a few of the different T-CONTs. The host 608 generally has knowledge of the acceptable packet rate per T-CONT, which may be obtained by analyzing the number of dropped packets and/or by monitoring the arrival rate of responses and acknowledges. The host 608 programs a rate control for each of the queues in the host memory. By default, rate control values may be set to 0 and queues are not rate controlled.

On the hardware side, the hardware logic looks into a queue to determine its transmission rate (e.g., fast/slow) in terms of bandwidth. In particular, the hardware may utilize a lookup table to determine how much delay to associate with each T-CONT. When buffering and handling a data packet for transmission, the hardware pulls data for a descriptor, examines it and if time has not expired the hardware slows down the transmission rate. The hardware may control the flow at the packet level (i.e., the hardware does not break up packets or count bytes for the purpose of rate control) by modulating the inter-packet-gap (IPG) to achieve the right rate control. Generally, the goal is to achieve a minimum IPG, though it is noted that there need not be a maximum IPG constraint. The rate is controlled, accurate DBRu reporting may be achieved, by throttling the DMA engine 524 that reads in the correct amount of traffic (e.g., payload data) according to the pre-configured rate. As such, the data transmission cache stores the "true" amount of traffic and generates the DBRu reports dynamically.

Rate control may be defined as time per packet transmitted. In one example, a 1 microsecond rate control unit may used which is equivalent to a 125 byte time in 1 Gigabit. If rate control is utilized due to a rate limit, the host 608 programs the rate control table. When the host 608 updates a descriptor queue write pointer to the transmission queue manager, the transmission queue manager compares the pointers. If there is work to do, the transmission queue manager outputs an entry containing the Queue ID to the rate control engine. The hardware then retrieves the rate control value of this queue from the rate control table. Non-rate controlled queues are sent to DMA. When a queue exits the rate control engine, the transmit DMA queue manager processes it according to the flow described in FIG. 9.

Figure 9:
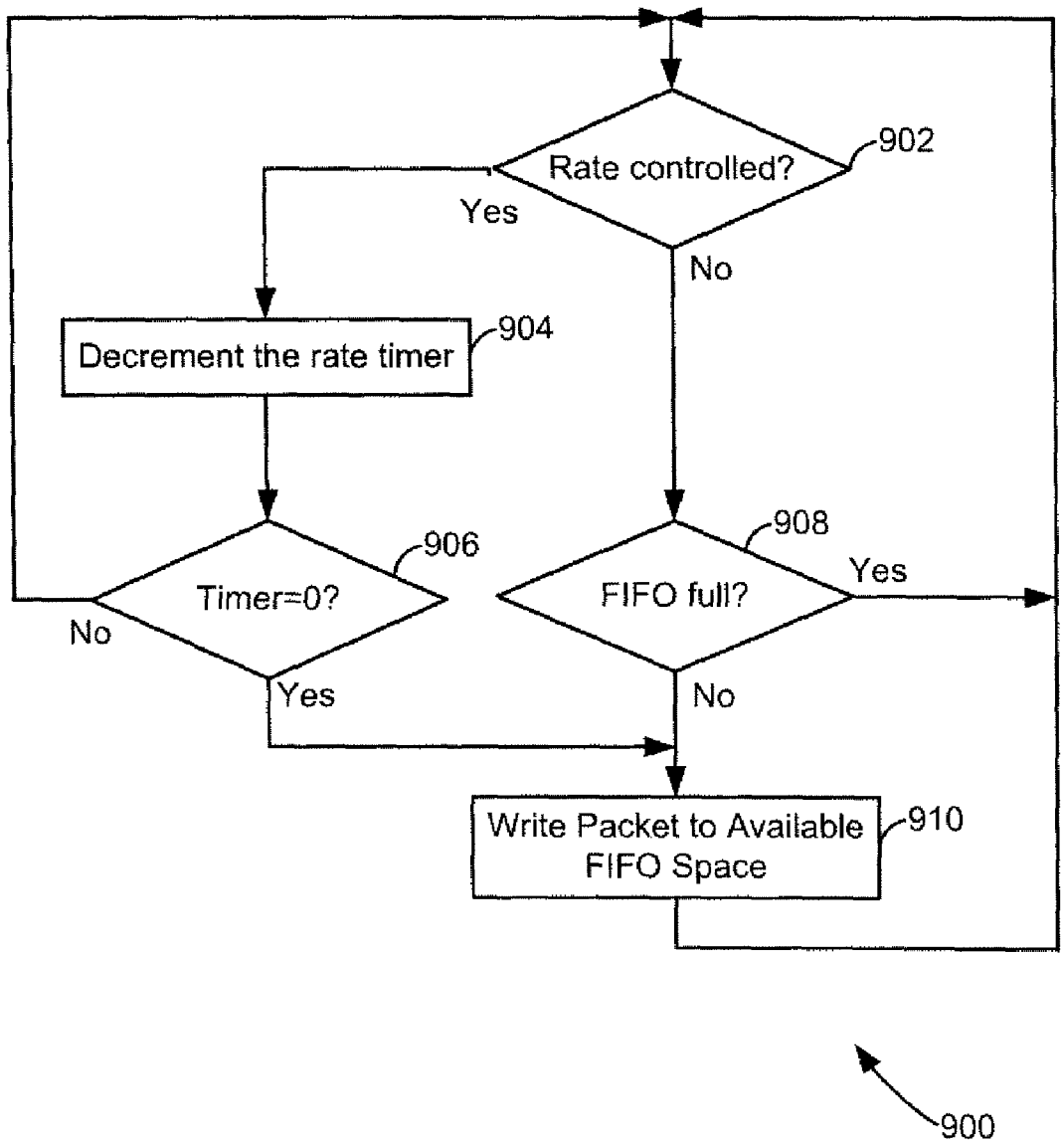
FIG. 9 is a flow diagram of a rate control routine for transmitting data packets.

Referring to FIG. 9, an example of a rate control routine 900 is shown. Beginning at block 902, the routine 900 determines if the queue is rate controlled or not. If so, the routine 900 attempts to minimize the IPG by decrementing a rate counter at block 904 and determines if the time has reached zero at block 906. If not, control returns to block 902 for the next data packet. On the other hand, if the time reaches zero, the minimum IPG has been achieved, and a DMA write request is initiated from the host 608 to write the data packet to the data transmission cache at block 910. If there are multiple packets to transmit, after direct memory accessing each data packet, the queue ID is returned to the rate control engine to be rate controlled again.

Referring back to block 902, if the queue is not rate controlled, the write request is initiated and the data packet is written to the data transmission cache until the cache is full as determined at block 908. In particular, if a queue is not rate controlled and there are multiple data packets to transmit, the transmission queue manager processes all the data packets in the queue.

Because the buffering and handling disclosed herein utilizes a series of writes to reduce internal latency, events are utilized as a reporting method. For example, the host 608 relies on event to known when and how many descriptors have been processed on the transmit data path 602, and uses events on the receive data path 604 to know the integrity of the data packet (e.g., CDC), underflow, overflow, parsing results, type of information, etc. Events are status words gathered from various sources in the hardware, and may generate interrupts when enabled. However, interrupts may be minimized to reduce interrupt latency and processor overhead. Events are written into various locations in the host 608. The locations are organized as event queues in the host memory which wrap around after reaching the top. Generally the number of event queues are kept small (e.g., 4-6). Events are written out by the hardware instead of being read by the host 608 in order to improve event delivery latency and overall bus efficiency. In one example, a maximum of 1K event queues are implemented, where event queues 0 to 3 are dedicated to a maximum of 4 processor queues. Event queues are large enough such that the host 608 can keep up with servicing the queues and the hardware will not overwrite events before they are serviced by the host 608. All event queue entries may be initialized by the host 608 to all zeros, and the hardware writes them with non-zero values. The host 608 clears them to zero after servicing. The host 608 may poll its current location, inside the host memory, to detect whether the queue has over-wrapped.

The hardware implements an event pointer table to maintain the state of the event queues. Each event queue has a corresponding entry in the table and may have the following format:

| Field | Width | Description |
|---|---|---|
| evq_en | 1 | Event queue enable. Software can set the bit in any of the Event Queue Table entries.<br>When this bit transitions from 0 to 1, an event queue is enabled and hardware generates a event queue initialization global event. |
| evq_size | 2 | Event queue size with the following number of entries:<br>00: 128<br>01: 256<br>10: 512<br>11: 1024 |
| evq_buf_base_id | 20 | Base address, 4k aligned |
| Sub-Total | 23 | The above bits are mapped to host address space control to be accessible by software. Bits below are for hardware use and are read-only by software. |

In one example, an event word is 4 bytes wide with a 30-bit event data field, and events are classified into different event types as indicated by event codes. An example of the format for an event is given below:

| Field | Width | Description |
| --- | --- | --- |
| ev_code | 4 | Event code. Supports the following event types: Receive packet events Transmit packet events Timer events Globe event PIO events Driver generated events |
| ev_data | 28 | Event data. Bit mapping. |
| Total | 32 | |

Events may be coalesced or collected (e.g., batched) for the same queue and delivered together.

An event cache may be implemented to buffer up events waiting to be written out to the host memory. The depth of the event cache may be small to ensure low latency delivery (e.g., 16 entries). When the event cache is full, all agents may be back-pressured. Non-transmit event delivery may pre-empt other transfers in order to be timely.

When the interrupt enable bit of the event table entry is set, the hardware generates interrupts after the event has been written out to the event queue. Interrupts are used to wake up sleeping processes and to flag errors. Events may also used be to flag PHY interrupts and other out-of-band errors usually.

In heavy interrupt situations, it is desirable to rate control interrupts with certain gap to prevent the processor from being saturated by interrupts. For example, in a multi-processor and/or multi-thread environment, it may be desirable to only utilize one processor or thread rather than activating all processors or threads. A timer may be implemented in the hardware which may be set by the host 608 as a trigger event to activate the host 608 (e.g., a host software driver). For interrupts that do not need immediate attention, the timer may be set to activate the host 608 at periodic intervals (e.g., 100 ms). During the interval, a number of data packets may be received, and after the interval (e.g., every 100 ms) the host 608 processes the data packets received during that interval and then stops, thereby allowing the processor to execute different instructions rather than being consistently interrupted to process each data packet. In one example, the timer is programmable with 1 microsecond increments up to 0.4 seconds.

In particular, when an interrupt is generated, the host enters an interrupt service routine to service the interrupt. While the interrupt is being serviced, more interrupt-generating events may be written into the event queue but the hardware will not generate any further interrupts while an interrupt is already outstanding. The host 608 keeps going down the event queue until there are no more outstanding events. At this point, the host 608 informs the hardware that the interrupt service routine is complete so the hardware can re-enable generating interrupts. To save bus bandwidth, a minimum of data exchange occurs between software and hardware during the interrupt service routine.

There is a potential race condition in which the host 608 finishes servicing all events and notifies the hardware by writing an interrupt service routine completion notice, the hardware generates another event and timing is such that the event is written out before interrupt service routine completion notice. In this case, the hardware may not generate a new interrupt and the host 608 is unaware of the new event in the event queue. As such, the host 608 may be required to wait for a period of time before exiting the interrupt service routine.

Alternatively, the host 608 may disable the interrupt line by writing to the interrupt enable bit. In particular, the host 608 writes the event queue read pointer to the hardware. In some cases, the host 608 may exit the interrupt service routine before finishing processing events so updating the event queue read pointer may happen after the interrupt has been re-enabled. In yet another alternative, the queue pointer update may be written back before servicing the last event. The latency of the event queue pointer update may be short so that by the time the host 608 finishes servicing the event, the interrupt line is asserted.

Based on the above disclosure, the proposed data packet buffering and handling is robust and efficient. For example, descriptors are naturally aligned, such that there is no need to guess the "next pointer", while also saving the extra bits for next_pointer. The descriptors may be "pushed" into hardware cache in batches, thereby saving bus bandwidth and lowering bus activities. After descriptors have been pushed into the hardware, the host may enter a sleep mode until the hardware reports back, waking up the host 608 by either interrupts or a timer, thereby will lower processor utilization. After descriptors been used or processed, the hardware sends back the pointer that was last used, and the host 608 can flush out all descriptors up to the last reported pointer. This creates a significant increase in efficiency or processing power, especially if the completion vent is batched (e.g., 16 or more descriptors).

Accordingly, the data packet buffering and handling provide a simple and reliable setup between host 608 and hardware for moving user traffic. Fast activation and low latency for is achieved both transmission and receiving operations, by reducing the number of reads and interrupts which slows operations and eliminating the necessity of polling by using writes and push outs.

The buffering and handling further utilizes dynamic and flexible method to accommodate any size of host memory without modification of the hardware configuration. For example, the descriptor ring size may be changed dynamically. A data packet may be fragmented and associated with a chain of descriptors, such that there is no limit in data packet size that may be processed, and several descriptors may be utilized to channel a data packet.

The use of a small cache in the hardware as virtual cache may achieve robustness and high performance. That is, when the host 608 creates descriptors, writes are used to push the descriptors into the hardware, which stores a certain size descriptors due to the small cache and processes in real time to move the data in and out of the hardware. Nonetheless, as indicated above, there is no data packet size limitation, because multiple descriptor chains may be used and there is not hard boundary for the descriptors The descriptor ring size may be programmed according to each traffic class (e.g., T-CONT) and bandwidth requirement. Each queue in the host memory may have its own descriptor ring, and the size of the ring is not necessarily the same depending on the type of data packet or the data packet requirements (e.g., slow traffic or low bandwidth traffic may use a small ring versus high bandwidth traffic).

Scattered data buffers may be utilized with multiple descriptors for a single data packet, such that no duplicated data packet copying is required, higher efficiency is achieved with little processor overhead and low latency. Essentially, the host memory is remapped and does not have to be contiguous because have several buffers (queue) may be provided at different locations. The descriptor points to different areas in the host memory. For example, with an IP packet, a new header is created above the older data with another descriptor used and appended to the old data, thereby obviating the need to add a header and CRC to each movement of data. In other words, the hardware is able to take a descriptor from anywhere in the host memory, and does not need to copy the data from one location to another location and add a header and CRC.

Batched transmission/reception completion events reduce the bandwidth requirement for buffer management. Every time the hardware DMA engine is finished with the descriptor, the hardware can either return the descriptor to the host 608 or batch the descriptors and return a pointer for the batched descriptor to the host 608. The host 608 looks into the event queue to see which descriptors have been returned, rather than polling the hardware. In other words, the hardware writes an event back to the host memory and the host checks to see what packets have been returned w/o polling or reading.

The data packet buffering and handling is also suitable for quality of service implementation, using simple "weighted-round-robin" arbitration combined with a rate control scheme to achieve priority and bandwidth control. Because each queue has it own descriptor, logic may be implemented to decide how much opportunity each queue is given to process. For example, to make up for a slow queue (e.g., a slow device associated with the queue), a data packet is processed as determined by the queue's rate of processing. The DMA engine processes the packet at the rate and automatically stores it in the data transmission cache at the desired rate. Further, the use of multiple interrupts batched according to intervals of time helps achieve low latency and high efficiency in a multi-thread, multi-processor system.

While the present invention has been described with reference to specific examples, which are intended to be illustrative only and not to be limiting of the invention, it will be apparent to those of ordinary skill in the art that changes, additions or deletions in addition to those explicitly described above may be made to the disclosed embodiments without departing from the spirit and scope of the invention.

What is claimed is:

1. A method of managing and buffering packet data for transmission out of a host comprising:
   caching descriptor ring data pushed in from a host memory into a descriptor ring cache, wherein the descriptor ring data comprises one or more data packet descriptors each corresponding to a requested data packet to be transmitted;
   processing the descriptor ring data cached in the descriptor ring cache to read a data packet descriptor from the descriptor ring data;
   initiating a direct memory access transfer from the host to write the requested data packet corresponding to the data packet descriptor to a data transmission buffer;
   caching the requested data packet from the host memory into the data transmission buffer, wherein the requested data packet is written by the direct memory access into the data transmission buffer in response to the direct memory access transfer from the host;
   transmitting the cached data packet out of the data transmission buffer; and
   writing a return pointer to the host memory indicating that the data packet descriptor has been read and the corresponding data packet has been transmitted.

2. The method of claim 1, wherein the host memory comprises a plurality of data transmission queues and a descriptor ring for each data transmission queue comprising one or more data packet descriptors, and wherein caching descriptor ring data comprises mapping each cached data packet descriptor into the corresponding data transmission queue.

3. The method of claim 1, wherein caching descriptor ring data comprises caching the descriptor ring data in response to one or more of the group consisting of: elapse of a predetermined period of time, in response to a transmission idle state and in response to a return pointer being written to the host memory indicating a previous data packet descriptor had been read and the corresponding data packet had been transmitted.

4. The method of claim 1, wherein caching descriptor ring data comprises caching a batch of data packet descriptors, and wherein the data packet descriptors are written by the host into the descriptor ring cache as a batch.

5. The method of claim 1, wherein processing descriptor ring data cached in the descriptor ring cache comprises:
   receiving an alert resulting from caching the descriptor ring data into the descriptor ring cache; and
   processing the descriptor ring data in response to the alert.

6. The method of claim 1, wherein the host memory comprises a plurality of data transmission queues and a descriptor ring for each data transmission queue comprising one or more data packet descriptors, wherein processing descriptor ring data cached in the descriptor ring cache comprises processing descriptor ring data cached in the descriptor ring cache to read a priority associated with a data packet, a size of the associated data packet and a location of the associated data packet in the host memory.

7. The method of claim 6, wherein initiating a direct memory access transfer from the host comprises initiating a direct memory access transfer from the host to write the data packet corresponding to the read data packet descriptor to the data transmission buffer based on the data packet descriptor.

8. The method of claim 6, wherein caching the requested data packet from the host memory into the data transmission buffer comprises caching the requested data packet from the host memory into one of a plurality of data transmission buffers, wherein selection of the data transmission buffer is based on the data packet descriptor and availability of the data transmission buffers.

9. The method of claim 1, wherein writing a return pointer to the host memory comprises writing a return pointer of the last data packet descriptor read from among the descriptor ring data cached in the descriptor ring cache to the host memory, wherein the return pointer of the last data packet descriptor corresponds to the last data packet descriptor read from the descriptor ring cache and indicates to the host the descriptor ring cache may be emptied, and wherein the return pointer indicates that a plurality of data packet descriptors have been read and the corresponding data packets have been transmitted.

10. The method of claim 1, wherein different data packets comprise different transmission rates, wherein a transmission rate comprises the time to transmit the data packet, and wherein the host memory comprises a plurality of data transmission queues each corresponding to one of the transmission rates, the method further comprising:
   determining the transmission rate corresponding to each data transmission queue; and
   adjusting a delay between initiating direct memory access transfers from the host to write data packets to the data transmission buffer based on the transmission rate.

11. The method of claim 1, wherein the host memory comprises a plurality of data transmission queues and an event queue corresponding to each data transmission queue, the method further comprising:
   maintaining an event pointer table having a entry for each event queue;
   batching events corresponding to the same data transmission queue in an event cache; and writing a batch of events from the event cache to the event queue corresponding to the data transmission queue based on the entry for the event queue in the event pointer table.

12. The method of claim 1, further comprising:
generating an interrupt to be written to the host;
delaying writing of the interrupt to the host if the host is processing another interrupt;
writing the interrupt to the host upon receiving a completion notice from the host indicating completion of the other interrupt.

13. The method of claim 1, wherein event occurrences generate interrupts to be written to the host, the method further comprising:
batching interrupts during a predetermined period of time; and
triggering the host after the predetermined period of time, wherein the host processes each interrupt generated during the predetermined period of time.

14. A method for managing and buffering packet data for transmission to a host comprising:
caching descriptor ring data pushed in from a host memory into a descriptor ring cache, wherein the descriptor ring data comprises one or more data packet descriptors each corresponding to a data packet to be received and wherein the descriptor ring data is written by the host into the descriptor ring cache;
caching data packets for transmission to the host memory into a data reception buffer;
reading data from the data reception buffer according to a data packet descriptor retrieved from the descriptor ring cache;
initiating a direct memory access transfer to write the data packet to a data reception queue within the host memory; and
writing a return pointer to the host memory indicating that the data packet has been written to the host memory.

15. The method of claim 14, further comprising:
parsing a data packet header of the data packet to read a port identification from the data packet header;
determining a destination data reception queue in the host memory corresponding to the port identification; and
caching the data packet header with the data packet in the data reception buffer.

16. The method of claim 15, wherein determining the destination data reception queue in the host memory corresponding to the port identification comprises reading a destination data reception queue identification corresponding to the port identification.

17. The method of claim 15, further comprising writing the data packet to a default data reception queue if the port identification does not correspond to a destination data reception queue.

18. The method of claim 14, further comprising:
performing a data integrity check on the cached data packet; and
generating an event to the host if the cached data packet lacks integrity.

19. The method of claim 14, wherein the host memory comprises a plurality of data reception queues and a descriptor ring for each data reception queue comprising one or more data packet descriptors, and wherein caching descriptor ring data comprises mapping each cached data packet descriptor into the corresponding data reception queue.

20. The method of claim 14, wherein caching descriptor ring data comprises caching the descriptor ring data in response to one or more of the group consisting of: elapse of a predetermined period of time, in response to a reception idle state and in response to a return pointer being written to the host memory indicating a previous data packet had been written to the host memory.

21. The method of claim 14, wherein caching descriptor ring data comprises caching a batch of data packet descriptors wherein the data packet descriptors are written by the host into the descriptor ring cache as a batch.

22. The method of claim 14, wherein writing a return pointer to the host memory comprises writing a return pointer of the last data packet descriptor read from among the descriptor ring data cached in the descriptor ring cache to the host memory, and wherein the return pointer of the last data packet descriptor corresponds to the last data packet descriptor read from the descriptor ring cache and indicates to the host the descriptor ring cache may be emptied.

23. The method of claim 14, wherein the host memory comprises a plurality of data reception queues and an event queue corresponding to each data reception queue, the method further comprising:
maintaining an event pointer table having a entry for each event queue;
batching events corresponding to the same data reception queue in an event cache; and
writing a batch of events from the event cache to the event queue corresponding to the data reception queue based on the entry for the event queue in the event pointer table.

24. The method of claim 14, further comprising:
generating an interrupt to be written to the host;
delaying writing of the interrupt to the host if the host is processing another interrupt;
writing the interrupt to the host upon receiving a completion notice from the host indicating completion of the other interrupt.

25. The method of claim 14, wherein event occurrences generate interrupts to be written to the host, the method further comprising:
batching interrupts during a predetermined period of time; and
triggering the host after the predetermined period of time, wherein the host processes each interrupt generated during the predetermined period of time.

* * * * *